United States Patent [19]

Sawai et al.

[11] Patent Number: 5,898,527
[45] Date of Patent: Apr. 27, 1999

[54] DECENTERED LENS HOLDING STRUCTURE AND ITS POSITIONING METHOD

[75] Inventors: Yasumasa Sawai; Tamotsu Kume; Hideki Nagata, all of Sakai; Akira Sato, Shiga-Ken; Masayuki Ueyama, Takarazuka, all of Japan

[73] Assignee: Minolta Co., Ltd., Japan

[21] Appl. No.: 08/828,779

[22] Filed: Mar. 27, 1997

[30] Foreign Application Priority Data

| Mar. 28, 1996 | [JP] | Japan | 8-073985 |
| Apr. 9, 1996 | [JP] | Japan | 8-086437 |
| Apr. 10, 1996 | [JP] | Japan | 8-088024 |
| Apr. 19, 1996 | [JP] | Japan | 8-098075 |
| Apr. 19, 1996 | [JP] | Japan | 8-098077 |
| Apr. 24, 1996 | [JP] | Japan | 8-102145 |
| Apr. 25, 1996 | [JP] | Japan | 8-105010 |
| Apr. 26, 1996 | [JP] | Japan | 8-107937 |

[51] Int. Cl.$^6$ ........................................ G02B 7/02
[52] U.S. Cl. ........................................ 359/819; 359/822
[58] Field of Search ........................ 359/819, 703, 359/704, 822

[56] References Cited

U.S. PATENT DOCUMENTS

| 4,256,372 | 3/1981 | Yasukuni et al. | 359/275 |
| 4,303,306 | 12/1981 | Ookawa | 359/819 |

*Primary Examiner*—Georgia Epps
*Assistant Examiner*—Suzanne Letendre
*Attorney, Agent, or Firm*—Burns, Doane, Swecker & Mathis, L.L.P.

[57] ABSTRACT

A structure for holding a decentered lens inside a lens barrel, as well as an axisymmetrical lens. The structure includes: a lens barrel with a lens receiving part projecting inwardly and radially from an inner surface thereof; a decentered lens, with a first lens surface as a reference surface a centering axis of which is made to coincide with an axis of the lens barrel, and a second lens surface, which includes an annular flat surface around the second lens surface, in which the annular flat surface forms a recessed surface relative to the second lens surface, in which the annular flat surface is perpendicular to the axis of the lens barrel, and in which the annular flat surface contacts the lens receiving part of the lens barrel; and a washer, installed on the inner surface of the lens barrel, to fixedly hold the decentered lens, relative to the lens barrel, by pinching the decentered lens between the washer and the lens receiving part of the lens barrel.

22 Claims, 21 Drawing Sheets

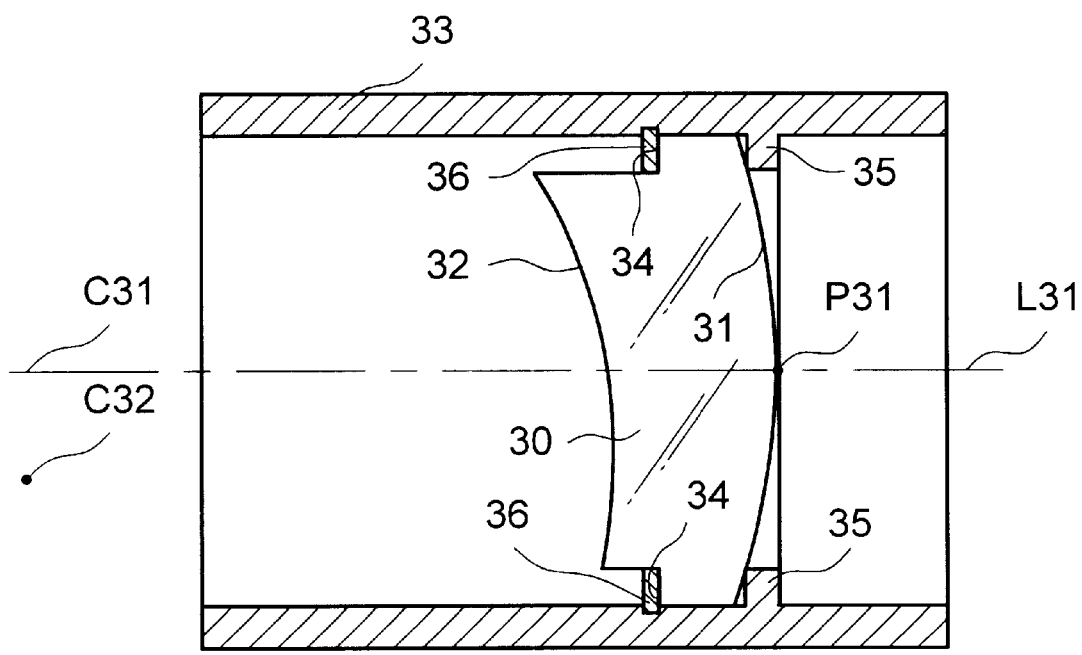
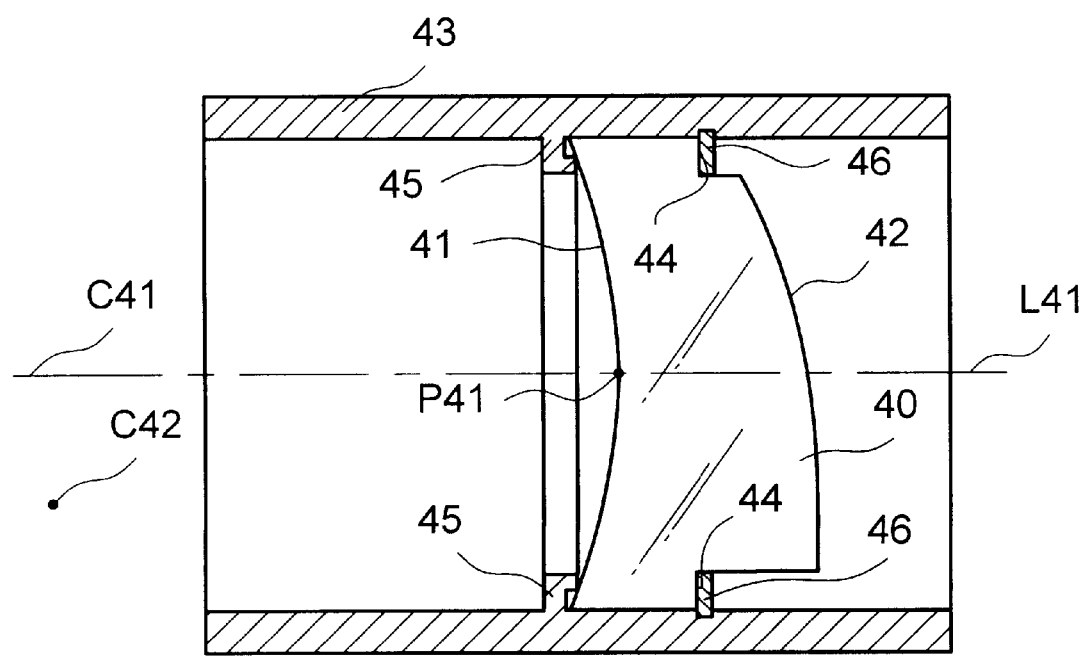

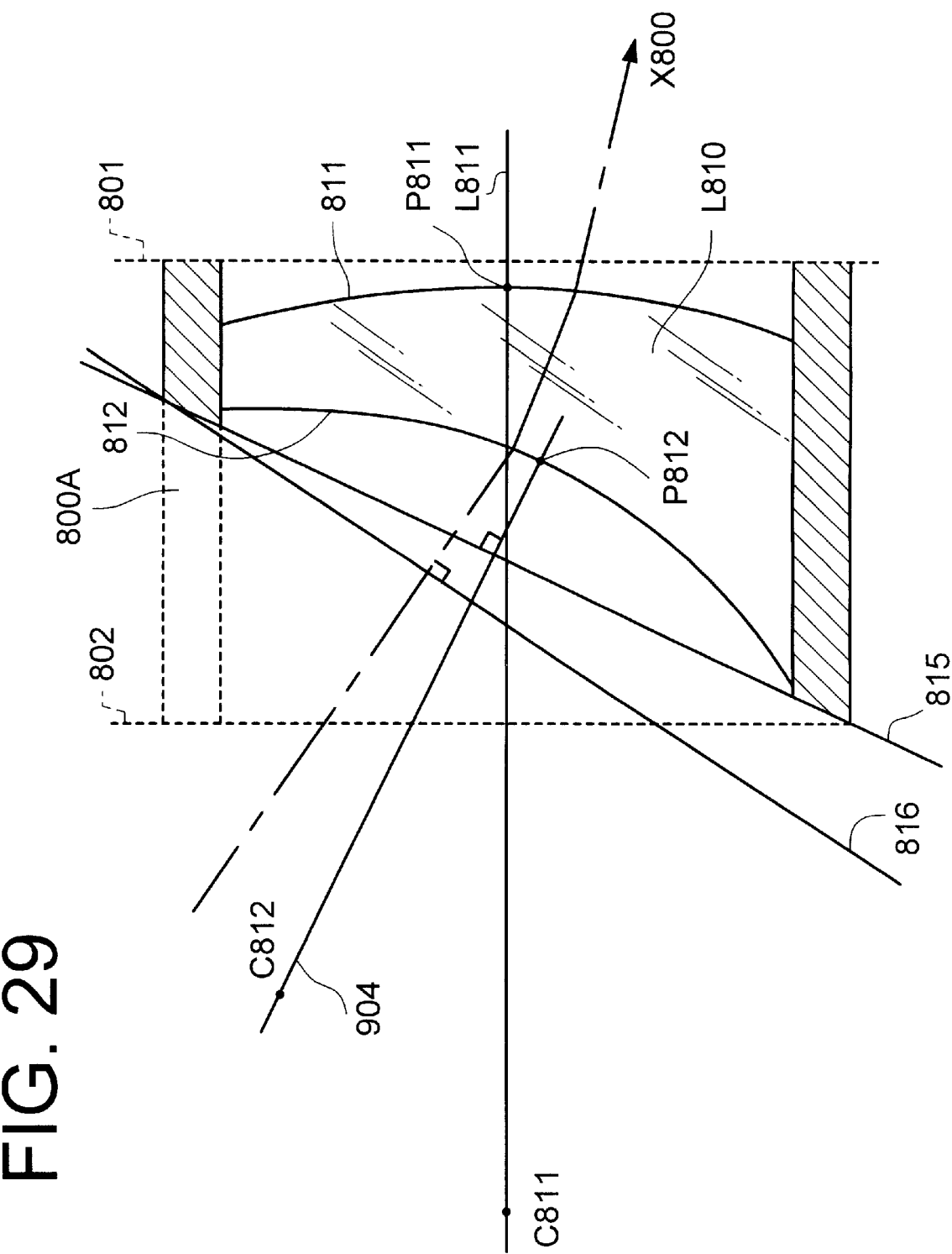

DECENTERED LENS HOLDING STRUCTURE AND ITS POSITIONING METHOD

BACKGROUND OF THE INVENTION

1. Field of the Invention

The present invention relates to a structure for holding a decentered lens which is used in an optical system, and to a method for positioning a plurality of decentered lenses relative to each other.

2. Description of the Related Arts

Conventionally, there has been provided an axisymmetrical lens which has two spherical lens surfaces having a common axis, and there has been provided a structure for holding such a lens. The lens holding structure employs a pair of annular members each of which contacts with each lens surface within one plane, where the lens is held by the two annular members with the lens being sandwiched therebetween in the axial direction.

On the other hand, there has been proposed a decentered lens. The decentered lens is one type of lens which has:

(1) a centering axis that is not coincident with the optical axis, in case of considering a single lens which has two centers of curvature, and only one optical axis; and (2) centers of curvature that do not exist along a straight line, in case of considering a plurality of lenses which have at least four centers of curvature and more than one optical axis.

Generally, the decentered lens is not uniform in thickness around its periphery.

If one tries to apply the aforementioned conventional lens holding structure as a structure for holding the decentered lens, the decentered lens, which does not have uniform thickness around its periphery, can not be held or pinched by the annular members which contact with the lens surfaces within one planes; thus impossible to adopt the conventional lens holding structure. It is to be noted that no optical devices that positively incorporate such decentered lenses have been developed into practical use till now, and that no techniques have been established for holding the decentered lens having nonuniform thickness at its periphery, as for holding the decentered lens(es) to a lens barrel.

In other words, the non-establishment of decentered lens holding technique has been one cause that obstructs the prevalence of the decentered lenses in various kinds of optical equipments and apparatus. Free incorporation of decentered lenses into such optical equipments and apparatus, if realized, will contribute to widening the variations in designing optical systems.

The decentered lens makes an image which is distorted in a certain direction. Therefore, in case that the decentered lens is used in an optical system, the decentered lens must be held so as not to rotate around its centering axis in order that the direction in which the image is distorted is not changed. There is no need of limiting the rotation of the aforementioned axisymmetrical lens because an image formed therethrough is not distorted in any particular directions. However, it is necessary to limit the rotation of the decentered lens.

Generally speaking, in case that a single lens is held in a lens barrel, the lens barrel is so formed that the axis of the lens barrel is coincident with the centering axis of the lens. Accordingly, in case that a plurality of lenses are held in a lens barrel, the lens barrel must be so formed that the axis of the lens barrel is coincident with all the centering axes of the lenses. Generally, in case that the plurality of lenses are the axisymmetrical lenses, the centering axes of all the lenses can be positioned along one common axis; therefore, the plurality of lenses can be held within one lens barrel, no matter how many lenses are involved.

On the other hand, in case that one tries to constitute an optical system in which a decentered lens and an axisymmetrical lens are used, and particularly that the decentered lens is held in a lens barrel with its centering axis of the decentered lens being inclined with respect to the axis of the lens barrel, any favorable technique for holding the decentered lens relative to the lens barrel has not been established yet.

Although the lens having its centering axis which is necessary to be inclined with respect to the axis of the lens barrel can be a decentered lens, the lens is not necessarily a decentered lens, but can be an axisymmetrical lens.

On the other hands, in an attempt to apply such a conventional holding structure for axisymmetrical lenses as described above to holding a decentered lens, because the decentered lens is not uniform in thickness around its peripheral portion or its periphery, it is not possible to pinch or sandwich the decentered lens by using an annular member, as according to the conventional lens holding structure, which contacts the lens surface within one plane. Furthermore, because the decentered lens has a pair of different symmetrical axes for two lens surfaces thereof, it must be taken into consideration how the centering axis of the decentered lens should be set or determined in order that the lens is well assembled to the lens barrel. Such a technical problem has never been tackled up to now at a level for practical use of decentered lenses.

Under the circumstances that techniques dealing with decentered lens have not been established yet as mentioned above, a technical problem about how the positional relation between the centering axes of the lenses and the axis of the lens barrel should be set and determined relative to each other in order that two or more decentered lenses are effectively mounted on and well assembled into the lens barrel in case that they are combined with each other, could be a further complex problem.

Meanwhile, generally, in case that a lens is held in a lens barrel, the lens barrel is so constructed that the axis of the lens barrel is coincident with the centering axis of the lens. Accordingly, in case that a lens barrel holds a plurality of lenses, all the lenses must be so held in one lens barrel that all the lenses held therein have one common centering axis.

Generally, regarding lenses of the so-called axisymmetrical configuration in which two lens surfaces comprising spherical surfaces have one common axis, the centering axes of all the lenses can be made to coincide with only one common axis, no matter how many lenses are involved. Therefore, it is possible to hold the plurality of lenses within one lens barrel.

For an attempt to construct an optical system that includes a plurality of lenses, held in one lens barrel, at least one of which is a decentered lens, especially, for an attempt to construct the optical system in which the decentered lens is held therein with the centering axis of the decentered lens being inclined with respect to the axis of the lens barrel, a favorable technique for holding the decentered lens therein in such a manner has not been established yet.

Also, in an optical system made up with a plurality of lenses in which at least one decentered lens is incorporated, the optical arrangement can be such that centering axes are not coincident with each other between or among the decentered lenses or lens blocks including the decentered lenses.

However, a favorable technique has not been established yet for assembling a plurality of lens barrels (i.e. lens blocks), each of which holds a decentered lens or decentered lenses, to each other with the axes of the lens barrels being inclined relative to each other.

By the way, the lens to be held inside the lens barrel can be a decentered lens or decentered lenses; in other words, an axisymmetrical lens or axisymmetrical lenses can also be held therein.

Meanwhile, for the aforementioned axisymmetrical lens, a method of cutting an opening portion of the lens barrel by a plane vertical to the axis thereof in vicinity of the lens so as not to impair the protection of the lens surface, is commonly used. Accordingly, for the axisymmetrical lens, if the lens barrel is cut with the method, there does not arise such a problem as eclipsing the optical axis.

However, in case of constructing an optical system by incorporating a decentered lens in a lens barrel so that a centering axis of the decentered lens is determined with one of two lens surfaces thereof being as a reference surface, the centering axis of which is made to coincide with an axis of the lens barrel, pencils of light are eclipsed, or intercepted, by a part, not holding the decentered lens, of the lens barrel, if cutting the opening portion of the lens barrel by a plane perpendicular to the axis of the lens barrel, as cutting the opening portion of the lens barrel for an axisymmetrical lens.

SUMMARY OF THE INVENTION

Therefore, it is an object of the present invention to provide a holding structure for a decentered lens, which allows the decentered lens, no matter what type it may be, to be held in a lens barrel inside which the decentered lens is held, conveniently.

It is another object of the present invention to provide the holding structure which not only allows the decentered lens, no matter what type it may be, to be held in a lens barrel conveniently, but also prevents a relative rotation of the decentered lens to the lens barrel.

It is still another object of the present invention to provide a lens barrel which is held in another lens barrel so that a centering axis of a lens held in the former lens barrel is inclined relative to an axis of the latter lens barrel in which a lens is held.

It is still another object of the present invention to provide the holding structure which allows a pair of decentered lenses to be held in one lens barrel conveniently.

It is still another object of the present invention to provide the holding structure therefor which allows three or more decentered lenses to be held in one lens barrel conveniently.

It is still another object of the present invention to provide the holding structure, by which a centering axis of one of three decentered lenses can be inclined with respect to a common centering axis of the other two decentered lenses.

It is still another object of the present invention to provide a positioning method for positioning three decentered lenses inside a lens barrel in which the three decentered lenses are held.

It is still another object of the present invention to provide an assembling structure, by which one lens barrel holding at least one lens is assembled to the other lens barrel including at least one lens, with a centering axis of the one lens barrel being positively inclined relative to a centering axis of the other lens barrel It is still another object of the present invention to provide an assembling which prevents the pencils of light from being eclipsed or intercepted by a part of the lens barrel on a side of a lens surface which is not taken as a reference surface for determining the centering axis thereof.

In accomplishing these and other objects of the present invention, there is provided a lens holding structure, comprising: a lens barrel; a decentered lens which comprises a first lens surface and a second lens surface which allow a light path to pass through them in an optical system and which is held in the lens barrel; and a fixing member for fixing the decentered lens relative to the lens barrel, the first lens surface being a reference surface a centering axis of which corresponds to an axis of the lens barrel, the decentered lens further comprising an annular flat surface around the second lens surface, the annular flat surface forming a recessed surface relative to the second lens surface, and the annular flat surface being perpendicular to the centering axis of the reference surface, the lens barrel having a lens receiving part, projecting inwardly and radially from an inner surface of the lens barrel, which receives one of the first lens surface and the annular flat surface of the decentered lens, and the fixing member contacting one of the annular flat surface and the first lens surface of the decentered lens so that the decentered lens is fixed between the lens receiving part and the fixing member.

In respect of a decentered lens, two axiasymmetrical lens surfaces A and B are given, as shown in FIG. 5. For example, the centering axis of the lens with the lens surface A being taken as a reference lens surface is determined in the following way.

That is, in case that a center of curvature of the lens surface A is designated by CA, an effective light path region on the lens surface A is designated by DA, an effective light path region on the lens surface B is designated by DB, and a center of an arbitrary circle P (see FIG. 6) on the lens surface A including the light path region DA inside is designated by CS, if a cylinder S includes the light path region DB inside the cylinder S which includes the circle P with an axis designated by a line L which is set by connecting CA and CS, such a line L can be a centering axis of the decentered lens. In other words, if the decentered lens is arranged or positioned relative to the cylinder S in such a way that the axis of the cylinder passes through the center of curvature of one of two lens surfaces, and if the cylinder S contains both the effective light path regions DA and DB, such an axis of the cylinder satisfying the conditions can be a centering axis thereof.

Consequently, such countless centering axes are possible to be set; however, actually, one of the centering axes is chosen as a centering axis so that its positional relation with other lenses is optimal, depending on the construction of the whole optical system including the decentered lens(es).

The annular flat surface can be axisymmetrical relative to the centering axis.

The decentered lens can further comprise a first cutting surface which exists around in a direction of periphery between the first lens surface and the annular flat surface; the decentered lens can comprise a second cutting surface which exists around in the direction of periphery between the second lens surface and the annular flat surface.

With the construction, it is preferable that the decentered lens comprises a first rotation inhibition part which is formed on one of the first and second cutting surfaces, and that the lens barrel further comprises a second rotation inhibition part which engages with the first rotation inhibition part for preventing relative rotation between the decentered lens and the lens barrel.

The fixing member may be a washer which is fixed on the inner surface of the lens barrel.

Alternatively, the fixing member may be a lens which is adjacent to the decentered lens.

There is also provided a lens holding structure, comprising: a lens barrel; a first decentered lens which has a first symmetrical axis of a first lens surface and a second symmetrical axis of a second lens surface, in which the first symmetrical axis and the second symmetrical axis do not coincide with each other, the first decentered lens being held in the lens barrel; a second decentered lens which has a third symmetrical axis of a third lens surface and a fourth symmetrical axis of a fourth lens surface, in which the third symmetrical axis and the fourth symmetrical axis do not coincide with each other, the second decentered lens being held in the lens barrel; a first fixing member for fixing the first decentered lens relative to the lens barrel; and a second fixing member for fixing the second decentered lens relative to the lens barrel, wherein a first centering axis, of the first decentered lens, which is determined relative to one, as a first reference surface, of the first lens surface and the second lens surface coincides with a second centering axis, of the second decentered lens, which is determined relative to one, as a second reference surface, of the third lens surface and the fourth lens surface, to form a common centering axis between the first decentered lens and the second decentered lens, wherein the common centering axis coincides with an axis of the lens barrel, wherein the first decentered lens further comprises a first annular flat surface around the other of the first lens surface an he second lens surface, the first annular flat surface forming a recessed surface relative to the other thereof, and the first annular flat surface being perpendicular to the common centering axis, wherein the second decentered lens further comprises a second annular flat surface around the other of the third lens surface and the fourth lens surface, the second annular flat surface forming a recessed surface relative to the other thereof, and the second annular flat surface being perpendicular to the common centering axis, wherein the lens barrel has a first lens receiving part, projecting inwardly and radially from an inner surface of the lens barrel, which receives one of the first reference surface and the first annular flat surface of the first decentered lens, and has a second lens receiving part, projecting inwardly and radially from the inner surface thereof, which receives one of the second reference surface and the second annular flat surface of the second decentered lens, wherein the first fixing member contacts one of the first annular flat surface and the first reference surface and of the first decentered lens so that the first decentered lens is fixed between the first lens receiving part and the first fixing member, and wherein the second fixing member contacts one of the second annular flat surface and the second reference surface of the second decentered lens so that the second decentered lens is fixed between the second lens receiving part and the second fixing member.

The first annular flat surface of the first decentered lens and/or the second annular flat surface of the second decentered lens may be axisymmetrical relative to the common centering axis.

The first fixing member may be a washer which is fixed on the inner surface of the lens barrel, and the second fixing member may be a washer which is fixed on the inner surface thereof.

There is also provided a method for positioning a first decentered lens and a second decentered lens inside a lens barrel, in which the first decentered lens has a first symmetrical axis of a first lens surface and a second symmetrical axis of a second lens surface, wherein the first symmetrical axis and the second symmetrical axis do not coincide with each other; and in which the second decentered lens has a third symmetrical axis of a third lens surface and a fourth symmetrical axis of a fourth lens surface, wherein the third symmetrical axis and the fourth symmetrical axis do not coincide with each other, comprising the steps of: selecting a first center of curvature arbitrarily from a pair of centers thereof of the first decentered lens, and selecting a second center of curvature arbitrarily from a pair of centers thereof of the second decentered lens, to determine a straight line, which connects the first center of curvature and the second center thereof to each other, as a common centering axis between the first decentered lens and the second decentered lens; and making the common centering axis coincide with an axis of the lens barrel, so that the first decentered lens and the second decentered lens are positioned relative to the lens barrel.

There is also provided a lens holding structure, comprising: a lens barrel; three or more decentered lenses which are held in the lens barrel; and fixing members for fixing the decentered lenses relative to the lens barrel, wherein each decentered lens has two lens surfaces and two symmetrical axes in which one of the two symmetrical axes does not coincide with the other thereof, wherein the decentered lenses are so arranged in the lens barrel that a centering axis, of each decentered lens, which is determined relative to one, as a reference surface, of the two lens surfaces thereof is made to coincide with each other to define a common centering axis among the three or more decentered lenses, and that the common centering axis is made to coincide with an axis of the lens barrel, wherein each decentered lens further comprises an annular flat surface around the other of the two lens surfaces, in which the annular flat surface forms a recessed surface relative to the other thereof, and in which the annular flat surface is perpendicular to the common centering axis, wherein the lens barrel has lens receiving parts, projecting inwardly and radially from an inner surface of the lens barrel, which receive one of the reference surface and the annular flat surface of each decentered lens, and wherein the fixing members contact one of the annular flat surface and the reference surface of each decentered lens so that each decentered lens is fixed between each lens receiving part and each fixing member.

The annular flat surface of each decentered lens may be axisymmetrical relative to the common centering axis.

The fixing members may be washers which are fixed on the inner surface of the lens barrel.

There is also provided a method for positioning three or more decentered lenses, each of which has two lens surfaces and two symmetrical axes in which one of the two symmetrical axes does not coincide with the other thereof, inside a lens barrel, comprising the steps of: selecting two arbitrarily from the decentered lenses, and selecting a common centering axis, between the two decentered lenses, which is determined by connecting one of two centers of curvature of one of the two decentered lenses, and one of two centers of curvature of the other of the two decentered lenses, to each other, positioning one of two centers of curvature of each of other remaining decentered lenses on the common centering axis; and making the common centering axis coincide with an axis of the lens barrel, so that the more than two decentered lenses are positioned relative to the lens barrel.

There is also provided a lens barrel, comprising: a barrel body; and a lens which is held inside the barrel body, wherein a centering axis of the lens coincides with an axis of the barrel body, and wherein end faces around openings at both axial ends of the barrel body are so formed that the end faces incline with respect to a direction which is perpendicular to the axis of the barrel body.

The lens can be a decentered lens which has a first symmetrical axis of a first lens surface and a second symmetrical axis of a second lens surface, in which the first symmetrical axis and the second symmetrical axis do not coincide with each other, and wherein the centering axis is determined with reference to the first lens surface as a reference surface.

There is also provided a lens barrel, comprising: a first lens barrel; a first lens which is held inside the first lens barrel; a second lens barrel which is held inside the first lens barrel; and a second lens which is held inside the second lens barrel, wherein a centering axis of the first lens coincides with a first axis of the first lens barrel, wherein end faces around openings at both axial ends of the first lens barrel are perpendicular to the first axis of the first lens barrel, wherein a centering axis of the second lens coincides with a second axis of the second lens barrel, and wherein the second lens barrel is held in the first lens barrel so that the first axis of the first lens barrel makes a predetermined angle with respect to the second axis of the second lens barrel.

There is also provided a lens holding structure, comprising: a first lens barrel; a first decentered lens and a second decentered lens which are fixedly held in the first lens barrel, wherein the first decentered lens has a first lens surface with a first symmetrical axis and has a second lens surface with a second symmetrical axis in which the first symmetrical axis does not coincide with the second symmetrical axis, and wherein the second decentered lens has a third lens surface with a third symmetrical axis and has a fourth lens surface with a fourth symmetrical axis in which the third symmetrical axis does not coincide with the fourth symmetrical axis; a first fixing member for fixing the first decentered lens relative to the first lens barrel; a second fixing member for fixing the second decentered lens relative to the first lens barrel; a second lens barrel; a third decentered lens which is fixedly held in the second lens barrel which is fixedly held in the first lens barrel, wherein the third decentered lens has a fifth lens surface with a fifth symmetrical axis and has a sixth lens surface with a sixth symmetrical axis in which the fifth symmetrical axis does not coincide with the sixth symmetrical axis; and a third fixing member for fixing the third decentered lens relative to the second lens barrel, wherein a centering axis which is determined with reference to the second lens surface of the first decentered lens is made to coincide with a centering axis which is determined with reference to the third lens surface of the second decentered lens, to form a common centering axis which is made to coincide with an axis of the first lens barrel, wherein the first decentered lens further comprises a first annular flat surface around the first lens surface, in which the first annular flat surface forms a recessed surface relative to the first lens surface, and in which the first annular flat surface is perpendicular to the common centering axis, and wherein the second decentered lens further comprises a second annular flat surface around the fourth lens surface, in which the second annular flat surface forms a recessed surface relative to the fourth lens surface, and in which the second annular flat surface is perpendicular to the common centering axis, wherein the first lens barrel has a first receiving part, projecting inwardly and radially from an inner surface of the first lens barrel, which receives the first decentered lens, and wherein the first lens barrel has a second receiving part, projecting inwardly and radially from the inner surface of the first lens barrel, which receives the second decentered lens, wherein the first receiving part contacts one of the second lens surface and the first annular flat surface of the first decentered lens, and the first fixing member contacts the other of the first annular flat surface and the second lens surface of the first decentered lens, so that the first decentered lens is held between the first receiving part and the first fixing member, wherein the second receiving part contacts one of the third lens surface and the second annular flat surface of the second decentered lens, and the second fixing member contacts the other of the second annular flat surface and the third lens surface of the second decentered lens, so that the second decentered lens is held between the second receiving part and the second fixing member, wherein a centering axis which is determined with reference to the fifth lens surface of the third decentered lens is made to coincide with an axis of the second lens barrel, wherein the third decentered lens further comprises a third annular flat surface around the sixth lens surface, in which the third annular flat surface forms a recessed surface relative to the sixth lens surface, and in which the third annular flat surface is perpendicular to the axis of the second lens barrel, wherein the second lens barrel has a third receiving part, projecting inwardly and radially from an inner surface of the second lens barrel, which receives the third decentered lens, wherein the third receiving part contacts one of the fifth lens surface and the third annular flat surface of the third decentered lens, and the third fixing member contacts the other of the third annular flat surface and the fifth lens surface of the third decentered lens, so that the third decentered lens is held between the third receiving part and the third fixing member, and wherein the axis of the second lens barrel tilts a predetermined angle with respect to the common centering axis.

There is also provided a method for positioning a first decentered lens, a second decentered lens and a third decentered lens inside a lens barrel, in which the first decentered lens has a first symmetrical axis of a first lens surface and a second symmetrical axis of a second lens surface, wherein the first symmetrical axis and the second symmetrical axis do not coincide with each other; in which the second decentered lens has a third symmetrical axis of a third lens surface and a fourth symmetrical axis of a fourth lens surface, wherein the third symmetrical axis and the fourth symmetrical axis do not coincide with each other; and in which the third decentered lens has a fifth symmetrical axis of a fifth lens surface and a sixth symmetrical axis of a sixth lens surface, wherein the fifth symmetrical axis and the sixth symmetrical axis do not coincide with each other, comprising the steps of: selecting a first center of curvature arbitrarily from a pair of centers thereof of the first decentered lens, and selecting a second center of curvature arbitrarily from a pair of centers thereof of the second decentered lens, to determine a straight line, which connects the first center of curvature and the second center thereof to each other, as a common centering axis between the first decentered lens and the second decentered lens; making the common centering axis coincide with an axis of the lens barrel which is a first lens barrel, so that the first decentered lens and the second decentered lens are positioned relative to the first lens barrel; making a centering axis of the third decentered lens coincide with an axis of a second lens barrel; and positioning the second lens barrel inside the first lens barrel with the axis of the first lens barrel being inclined a predetermined angle relative to the axis of the second lens barrel so that the centering axis of the third decentered lens inclines the predetermined angle relative to the common centering axis.

There is also provided an assembling structure of lens barrel, comprising: a first lens barrel which has a first axis and has a first end portion in a direction of the first axis, wherein the first end portion has a first planer configuration that is formed with reference to the first axis; a second lens barrel which has a second axis and has a second end portion in a direction of the second axis, wherein the second end portion has a second planar configuration that is formed with reference to the second axis; a wedge-like ring spacer which is so provided between the first planar configuration of the first lens barrel and the second planar configuration portion of the second lens barrel that the first axis and the second axis incline a predetermined angle relative to each other.

In the construction, the first lens barrel may hold a first decentered lens therein, and the second lens barrel may hold a second decentered lens therein, wherein a first centering axis of the first decentered lens coincides with the first axis, and a second centering axis of the second decentered lens coincides with the second axis of the second lens barrel, so that the first centering axis and the second centering axis incline the predetermined angle relative to each other.

By the way, although the construction is preferably applicable to such a decentered lens, it is also possible to apply the construction to a normal axisymmetrical lens.

There is also provided an assembling structure of lens barrel, comprising: a first lens barrel which has a first axis and has a first coupling portion with a first planar configuration that is formed with reference to the first axis; and a second lens barrel which has a second axis and has a second coupling portion with a second planar configuration that is formed with reference to the first axis, wherein the second coupling portion is connected to the first coupling portion so that the first axis of the first lens barrel and the second axis of the second lens barrel incline a predetermined angle relative to each other.

The first lens barrel may hold a first decentered lens therein, and the second lens barrel may hold a second decentered lens therein, wherein a first centering axis of the first decentered lens coincides with the first axis of the first lens barrel, and a second centering axis of the second decentered lens coincides with the second axis of the second lens barrel, so that the first centering axis and the second centering axis incline the predetermined angle relative to each other.

By the way, although the construction is preferably applicable to such a decentered lens, it is also possible to apply the construction to a normal axisymmetrical lens.

There is also provided a lens barrel, comprising: a barrel body; and a decentered lens which is held inside the barrel body, wherein a centering axis of the decentered lens, which is determined with reference to one of two lens surfaces thereof, is made to coincide with an axis of the barrel body, and wherein an opening edge, of the barrel body, locating on a side of the other of two lens surfaces thereof is formed by a cutting plane which is inclined relative to a plane perpendicular to the axis of the barrel body.

With the construction, the pencils of light, or rays of light, are prevented from being eclipsed by an extra or useless part forming the lens barrel which does not holds the decentered lens.

Preferably, the cutting plane can be perpendicular to an optical axis of the decentered lens.

With the construction, the pencils of light are eclipsed evenly; therefore, the problem that pencils of light are locally or partially eclipsed is surely avoided.

Alternatively, the cutting plane can be perpendicular to a chamfering axis of the other of two lens surfaces.

With the construction, the eclipse of pencils of light is prevented completely.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a sectional view showing a holding structure for a decentered lens according to a fourth embodiment of the present invention;

FIG. 4 is a sectional view showing a holding structure for a decentered lens according to a fifth embodiment of the present invention;

FIG. 29 is a view for explaining the present invention.

DETAILED DESCRIPTION OF THE INVENTION

Figure 1:
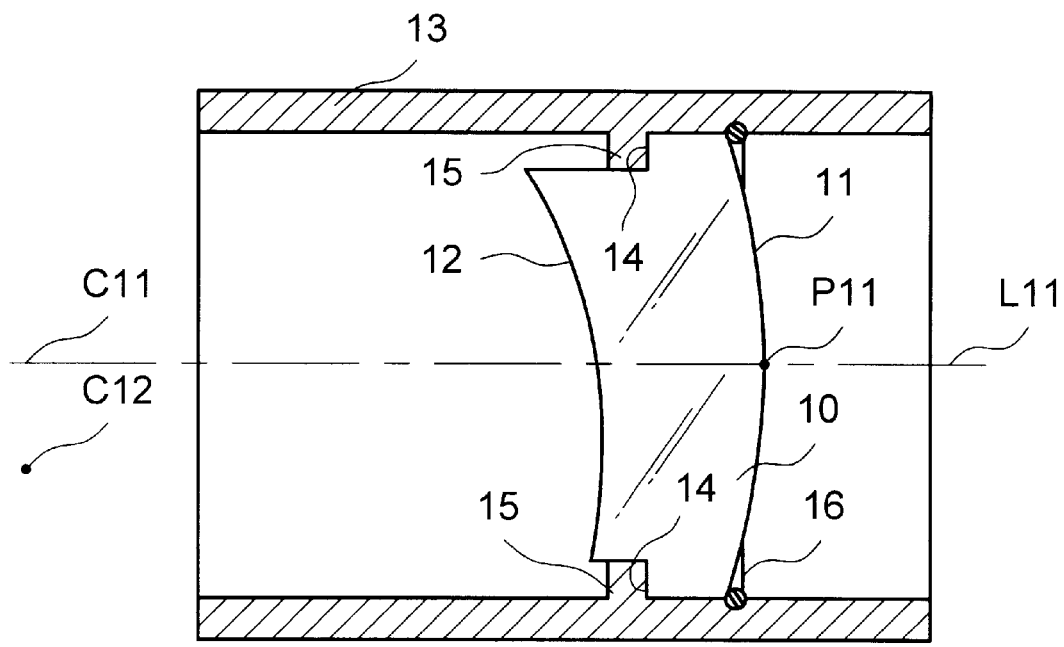
FIG. 1 is a sectional view showing a holding structure for a decentered lens according to a first embodiment of the present invention.

Before the description of the present invention proceeds, it is to be noted that like parts are designated by like reference numerals throughout the accompanying drawings.

FIG. 1 shows a holding structure for a decentered lens according to a first embodiment of the present invention. Referring to the figure, a reference numeral 10 denotes a decentered lens, which has a first lens surface 11 given by a convex curved surface, and a second lens surface 12 given by a concave curved surface. The centers of curvature of the first lens surface 11 and the second lens surface 12 are points C11 and C12, respectively. Their suffixed numerals correspond to the reference numerals of the lens surfaces, respectively. For this decentered lens 10, a centering axis L11 is determined with the first lens surface 11 being taken as a reference lens surface. That is, the centering axis L11 is given by a line that connects a center point P11 and the center of curvature C11 of the first lens surface 11 with each other. This centering axis L11 corresponds to the axial center of a cylindrical-shaped lens barrel 13 that holds the decentered lens 10 therein.

The center of curvature C12 of the second lens surface 12, which has not been taken as the reference, is out of the centering axis L11.

The decentered lens 10 has a step-like peripheral surface which is formed by removing a peripheral part thereof on a side of the second lens surface 12 from the second lens surface 12 towards the first lens surface 11 in a direction parallel to the centering axis L11, so that a flat annular surface 14 is formed around in a radial direction so as to form a recessed surface with respect to the second lens surface 12. This annular flat surface 14 is located within a plane perpendicular to the centering axis L11. Therefore, the annular flat surface 14 is axisymmetrical with respect to the centering axis L11. Also, the first lens surface 11, whose center of curvature C11 is located on the centering axis L11, is also axisymmetrical with respect to the centering axis L11. As explained above, the lens 10, being a decentered lens, has two axisymmetrical surfaces directed oppositely to each other relative to the centering axis L11, so that the lens is pinched in a direction of its thickness at the peripheral portions as in the case where a normal conventional axisymmetrical lens is held in a lens barrel in an ordinary way. It is noted that the removing part may be either removed by grinding or other machining processes, or that the step-like surface of the lens can be formed initially in the molding process.

In the lens barrel 13, a circular lens receiver 15 is formed so as to project radially inwardly from the inner surface. In this first embodiment, the annular flat surface 14 of the decentered lens 10 is hold or supported by the lens receiver 15 of the lens barrel 13. Also, a fixing washer 16 contacts a peripheral portion of the first lens surface 11 as the reference lens surface. The washer 16, while contacting with the first lens surface 11 in such a way that the lens 10 is pressed against the lens receiver 15, is fixed to the lens barrel 13, so that the decentered lens 10 is pinched between the lens receiver 15 of the lens barrel 13 and the washer 16 so as to be held fixed therebetween.

Figure 7:
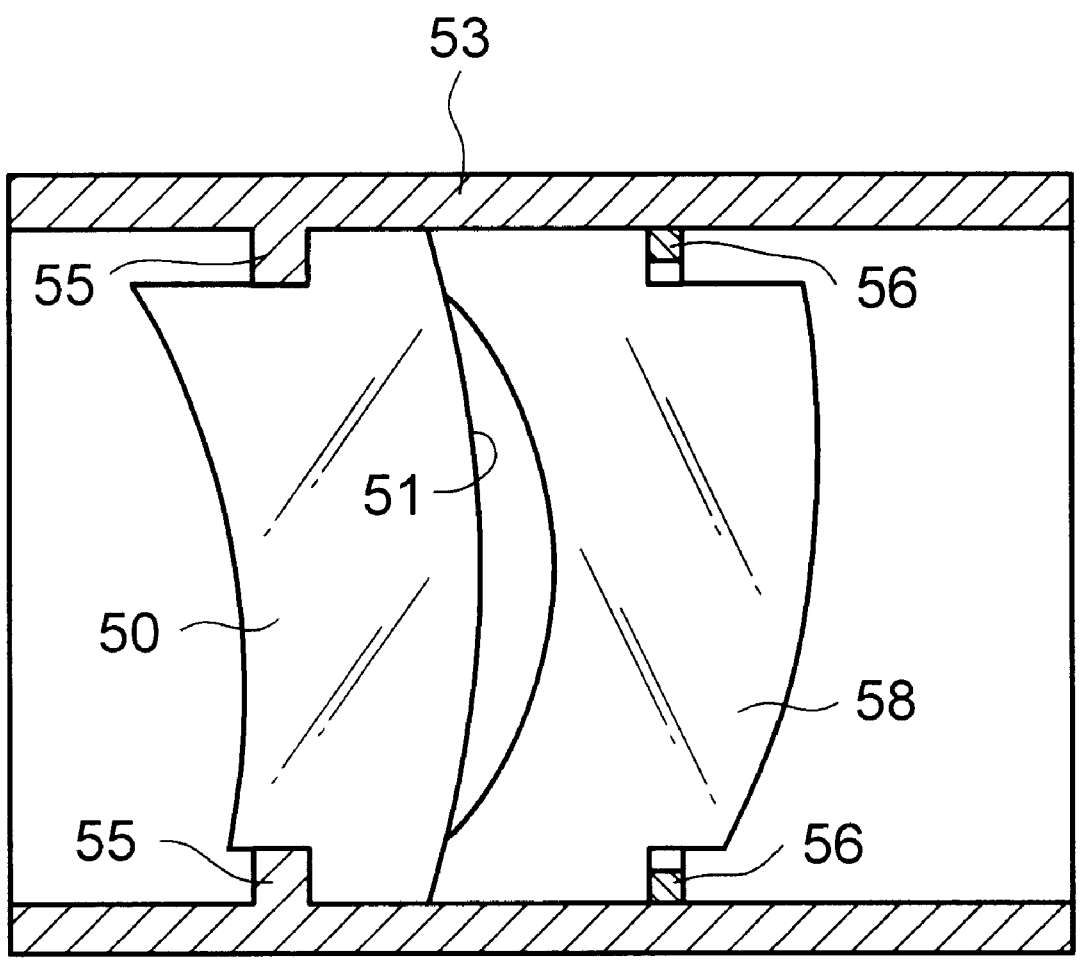
FIG. 7 is a sectional view showing a holding structure for a decentered lens according to a second embodiment of the present invention.

As lens fixing means substitutable for the washer 16, for example, an annular member equipped with an outer screw that screws the inner circumferential surface of the lens barrel may be used. Also, for example, as shown in FIG. 7 as a second embodiment of the present invention, in case that this decentered lens is used with another lens, a lens 50 can be directly pressed by a lens 58 adjacent to the lens 50 through the center, peripheral portion or entire surface of the lens 50. In this illustrative example, a reference numeral 51 denotes a convex lens surface, 53 denotes a lens barrel, 55 denotes a lens receiver, and 56 denotes a fixing washer.

Generally, the decentered lens is not uniform in lens thickness over the circumference, making it impossible to hold such a decentered lens to the lens barrel by conventional holding techniques for axisymmetrical lenses. However, if the reference lens surface is determined and also the centering axis is determined as described above, and if an annular flat surface perpendicular to the centering axis is formed, then a decentered lens, no matter which types the decentered lens belongs to, can be held in the lens barrel simply by the conventional holding techniques for axisymmetrical lenses.

Figure 2:
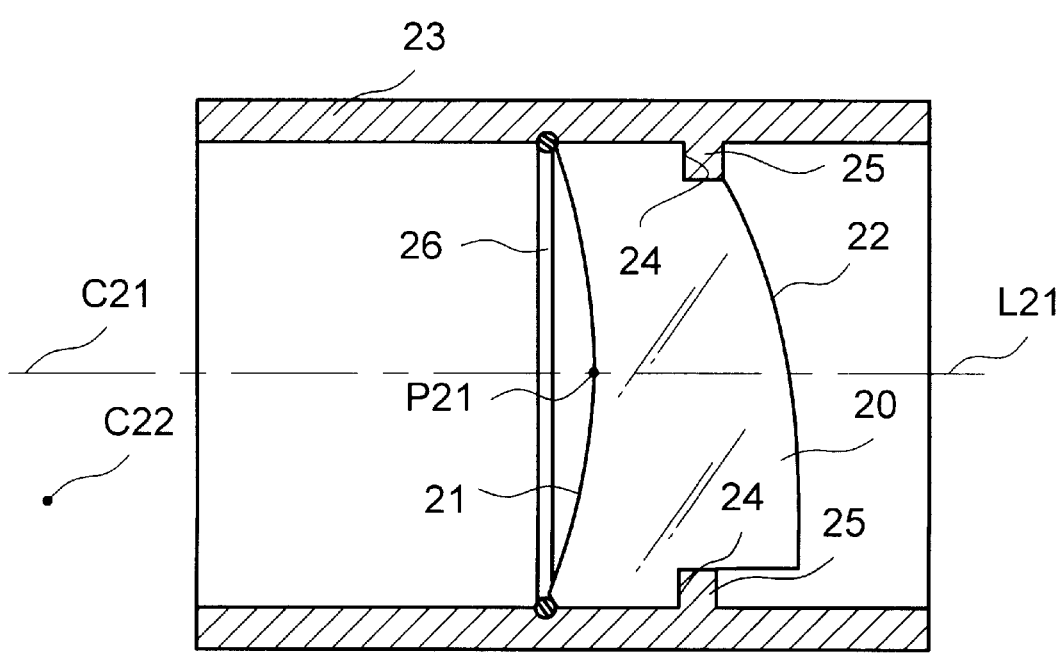
FIG. 2 is a sectional view showing a holding structure for a decentered lens according to a third embodiment of the present invention.
Figure 5:
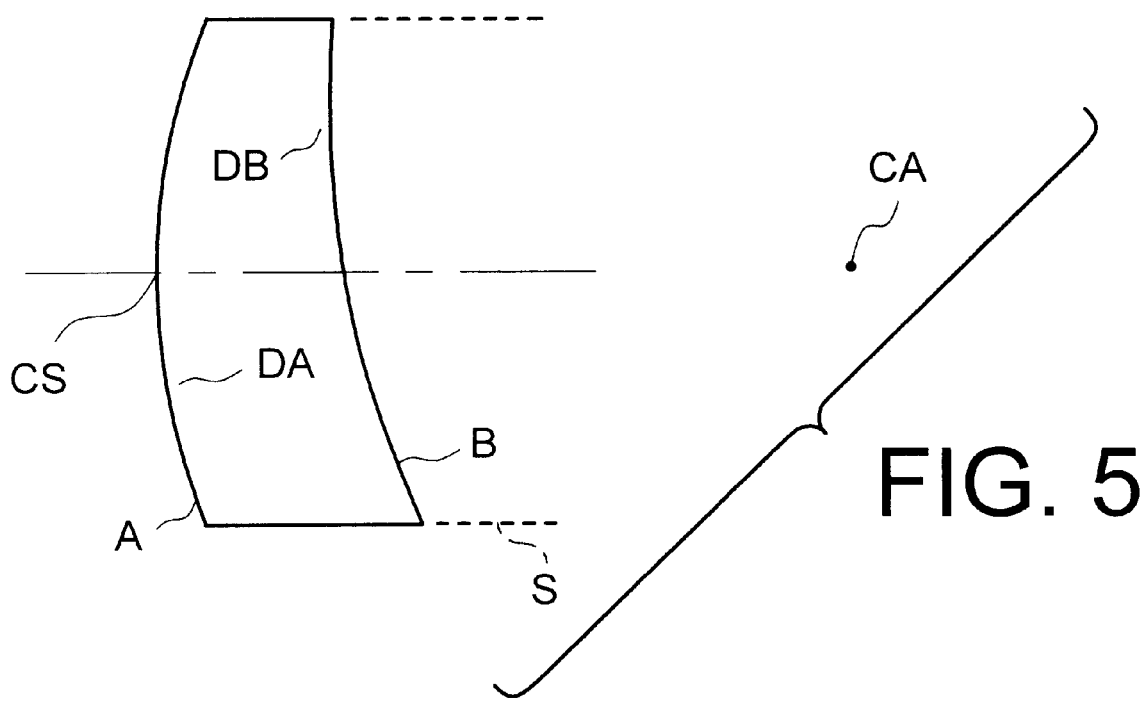
FIG. 5 is a view for illustrating how a centering axis is determined for the decentered lens.
Figure 6:
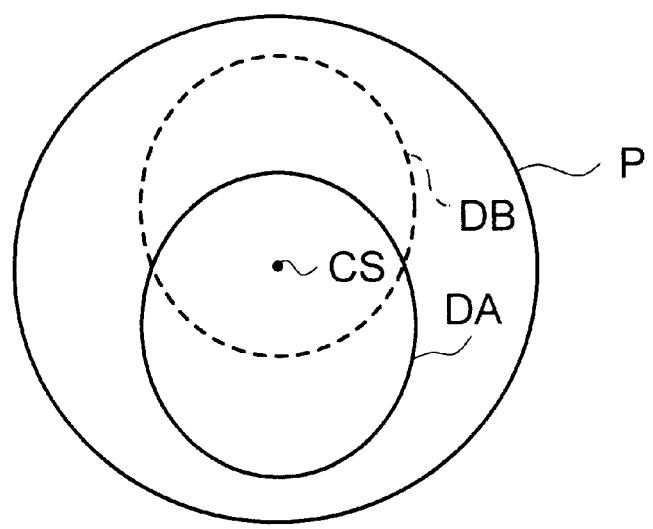
FIG. 6 is a view for illustrating how a centering axis is determined for the decentered lens.

FIG. 2 shows a holding structure for a decentered lens according to a third second embodiment of the present invention. Referring to FIG. 2, a reference numeral 20 denotes a decentered lens, which has a first lens surface 21 having a concave curved surface, and a second lens surface 22 having a convex curved surface. The centers of curvature of the first lens surface 21 and the second lens surface 22 are points C21 and C22, respectively. Their suffixed numerals correspond to the reference numerals of the lens surfaces, respectively. For this decentered lens 20, a centering axis L21 is determined with the first lens surface 21 taken as a reference lens surface, that is, the centering axis L21 is given by a line that connects a center point P21 and the center of curvature C21 of the first lens surface 21 with each other. This centering axis L21 corresponds to the axial center of a cylindrical-shaped lens barrel 23 that holds the decentered lens 20 therein. The center of curvature C22 of the second lens surface 22, which has not been taken as the reference, is positioned out of the centering axis L21.

The decentered lens 20 has a step-like peripheral surface which is formed by removing a peripheral part thereof on a side of the second lens surface 22 from the second lens surface 22 towards the first lens surface 21 in a direction parallel to the centering axis L21, so that a flat annular surface 24 is formed around in a radial direction so as to form a recessed surface with respect to the second lens surface 22. This annular flat surface 24 is located within a plane perpendicular to the centering axis L21. Therefore, the annular flat surface 24 is axisymmetrical with respect to the centering axis L21. Also, the first lens surface 21, whose center of curvature C21 is located on the centering axis L21, is axisymmetrical with respect to the centering axis L21. As explained above, the lens 20, being a decentered lens, has two axisymmetrical surfaces directed oppositely to each other, so that the lens is pinched in a direction of its thickness at the peripheral portion, as in the case where a conventional axisymmetrical lens is held in the lens barrel in an ordinary way.

In the lens barrel 23, a circular lens receiver 25 is formed so as to project radially inwardly from the inner circumferential surface of the lens barrel 23. In this embodiment, the annular flat surface 24 of the decentered lens 20 is supported by or against the lens receiver 25. Also, a fixing washer 26 contacts with a peripheral portion of the first lens surface 21 as the reference lens surface. The washer 26, while contacting with the first lens surface 21 in such a way that the lens 20 is pressed against the lens receiver 25, is fixed to the lens barrel 23, so as to pinch the decentered lens 20 between the lens receiver 25 of the lens barrel 23 and the washer 26 in order to fix the lens 20 therebetween.

FIG. 3 shows a holding structure of a decentered lens according to a fourth embodiment of the present invention. Referring to FIG. 3, a reference numeral 30 denotes a decentered lens, which has a first lens surface 31 given by a convex curved surface, and a second lens surface 32 given by a concave curved surface. The centers of curvature of the first lens surface 31 and the second lens surface 32 are points C31 and C32, respectively. Their suffixed numerals correspond to the reference numerals of the lens surfaces, respectively. For this decentered lens 30, a centering axis L31 is determined with the first lens surface 31 taken as a reference lens surface; that is, the centering axis L31 is given by a line that connects a center point P31 and the center of curvature C31 of the first lens surface 31 with each other. This centering axis L31 corresponds to an axial center of a cylindrical-shaped lens barrel 33 that holds the decentered lens 30 therein. The center of curvature C32 of the second lens surface 32, which has not been taken as the reference, is positioned out of the centering axis L31.

The decentered lens 30 has a step-like peripheral surface which is formed by removing a peripheral part thereof on a side of the second lens surface 32 from the second lens surface 32 towards the first lens surface 31 in a direction parallel to the centering axis L31, so that a flat annular surface 34 is formed around in a radial direction so as to form a recessed surface with respect to the second lens surface 32. This annular flat surface 34 is located within a plane perpendicular to the centering axis L31. Therefore, the annular flat surface 34 is axisymmetrical with respect to the centering axis L31. Also, the first lens surface 31, whose center of curvature C31 is located on the centering axis L31, is axisymmetrical with respect to the centering axis L31. As explained above, the lens 30, being a decentered lens, has two axisymmetrical surfaces directed oppositely to each other in order that the lens is pinched in a direction of its thickness at the peripheral portions, as in the case where a conventional axisymmetrical lens is held in the lens barrel in an ordinary way.

In the lens barrel 33, a circular lens receiver 35 is formed so as to protrude inwardly radially from the inner circumferential surface. In this embodiment, the first lens surface 31, which is the reference lens surface of the decentered lens 30, is supported at its peripheral portion by the lens receiver 35. Also, a fixing washer 36 contacts with the annular flat surface 34. The washer 36, while contacting with the annular flat surface 34 in such a way that the lens 30 is pressed against the lens receiver 35, is fixed to the lens barrel 33, so that the decentered lens 30 is pinched between the lens receiver 35 of the lens barrel 33 and the washer 36 for the purpose of fixing the decentered lens 31 therebetween.

FIG. 4 shows a holding structure for a decentered lens according to a fifth embodiment of the present invention. Referring to FIG. 4, a reference numeral 40 denotes a decentered lens, which has a first lens surface 41 given by a concave curved surface, and a second lens surface 42 given by a convex curved surface. The centers of curvature of the first lens surface 41 and the second lens surface 42 are points C41 and C42, respectively. Their suffixed numerals correspond to the reference numerals of the lens surfaces, respectively. For this decentered lens 40, a centering axis L41 is determined with the first lens surface 41 taken as a reference lens surface, that is, the centering axis L41 is given by a line that connects a center point P41 and the center of curvature C41 of the first lens surface 41 with each other. This centering axis L41 corresponds to the axial center of a cylindrical-shaped lens barrel 43 that holds the decentered lens 40. The center of curvature C42 of the second lens surface 42, which has not been taken as the reference, is positioned out of the centering axis L41.

The decentered lens 40 has a step-like peripheral surface which is formed by removing a peripheral part thereof from the second lens surface 42 towards the first lens surface 41 in a direction parallel to the centering axis L41, so that a flat annular surface 44 is formed around in a radial direction so as to form a recessed surface with respect to the second lens surface 42. This annular flat surface 44 is located within a plane perpendicular to the centering axis L41. Therefore, the annular flat surface 44 is axisymmetrical with respect to the centering axis L41. Also, the first lens surface 41, whose center of curvature C41 is located on the centering axis L41, is axisymmetrical with respect to the centering axis L41. As seen above, the lens 40, being a decentered lens, has two axisymmetrical surfaces directed oppositely to each other, so that the lens is pinched in a direction of its thickness at the peripheral portion, as in the case where an axisymmetrical lens is held in the lens barrel in an ordinary way.

In the lens barrel 43, a circular lens receiver 45 is formed so as to protrude inwardly radially from the inner circumferential surface. In this embodiment, the first lens surface 41, which is the reference lens surface of the decentered lens 40, is supported at its peripheral portion by the lens receiver 45. Also, a fixing washer 46 contacts with the annular flat surface 44. The washer 46, while contacting with the annular flat surface 44 in such a way that the lens 40 is pressed against the lens receiver 45, is fixed to the lens barrel 43, so that the decentered lens 40 is pinched between the lens receiver 45 of the lens barrel 43 and the washer 46 for the purpose of fixing the decentered lens 40 therebetween.

According to the holding structure for the decentered lens of the first through fifth embodiments of the present invention, any technique similar to the conventional technique for holding an axisymmetrical lens relative to the lens barrel can be used for holding the decentered lens relative thereto; therefore, it is easy to hold the decentered lens relative thereto.

Figure 8:
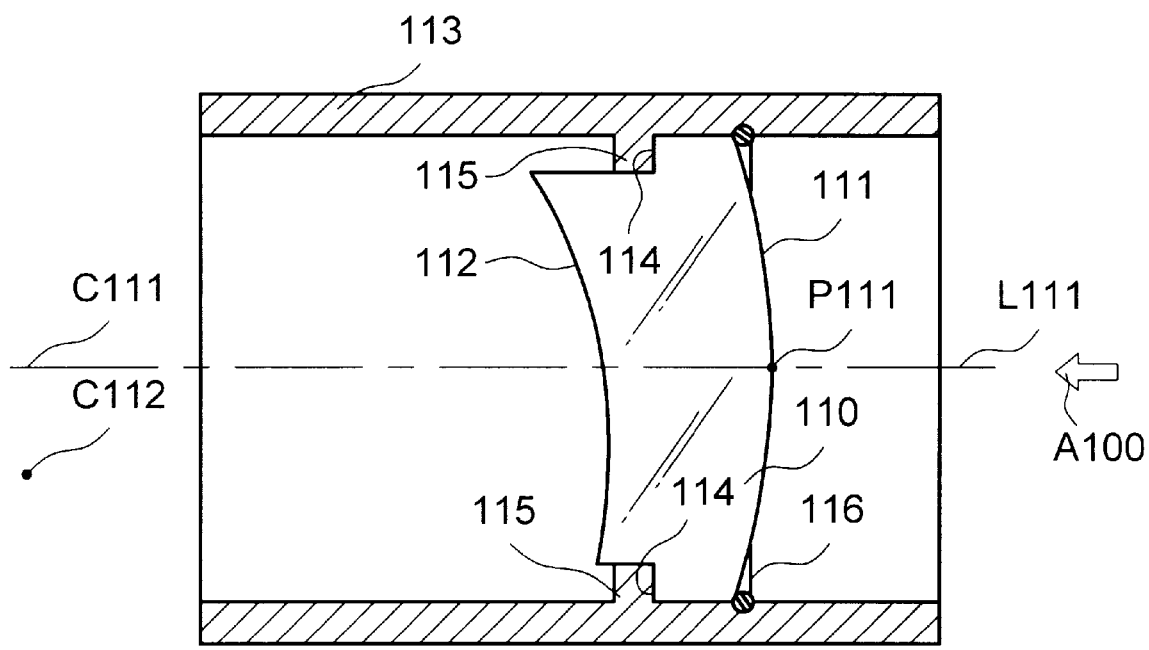
FIG. 8 is a sectional view showing a fundamental construction of a holding structure for a decentered lens according to the present invention.

FIG. 8 shows a fundamental construction of the holding structure for a decentered lens according to the present invention. Referring to FIG. 8, a reference numeral 110 denotes a decentered lens, which has a first lens surface 111 formed as a convex curved surface, and a second lens surface 112 formed as-a concave curved surface. The centers of curvature of the first lens surface 111 and the second lens surface 112 are points C111 and C112, respectively. Their suffixed numerals correspond to the reference numerals of the lens surfaces, respectively. For this decentered lens 110, a centering axis L111 is determined with the first lens surface 111 taken as a reference lens surface; that is, the centering axis L111 is given by a line that connects a center point P111 and the center of curvature C111 of the first lens surface 111 with each other. This centering axis L111 correspond to the axis of a cylindrical-shaped lens barrel 113 that holds the decentered lens 110 therein. The center of curvature C112 of the second lens surface 112, which has not been taken as the reference, is positioned out of the centering axis L111.

The decentered lens 110 has a step-like peripheral surface which is formed by removing a peripheral part thereof on a side of the second lens surface 112 from the second lens surface 112 towards the first lens surface 111 in a direction parallel to the centering axis L111, so that a flat annular surface 114 is formed around in a radial direction so as to form a recessed surface with respect to the second lens surface 112. This annular flat surface 114 is located within a plane perpendicular to the centering axis L111. Therefore, the annular flat surface 114 is axisymmetrical with respect to the centering axis L111. Also, the first lens surface 111, whose center of curvature C111 is located on the centering axis L111, is axisymmetrical with respect to the centering axis L111. As explained above, the lens 110, being a decentered lens, has two axisymmetrical surfaces directed oppositely to each other so that the lens is pinched in a direction of its thickness at the periphery, as in the case where an axisymmetrical lens is held in the lens barrel in an ordinary way. It is noted that the removing part may be either removed by grinding or other machining processes, or that the step-like surface of the lens can be formed initially in the molding process.

In the lens barrel 113, a circular lens receiver 115 is formed so as to protrude inwardly and radially from the inner circumferential surface. In this construction, the annular flat surface 114 of the decentered lens 110 is supported by the lens receiver 115. Also, a fixing washer 116 contacts with a peripheral portion of the first lens surface 111 as the reference lens surface. The washer 116, while contacting with the first lens surface 111 in such a way that the lens 110 is pressed against the lens receiver 115, is fixed to the lens barrel 113, so that the decentered lens 110 is pinched between the lens receiver 115 of the lens barrel 113 and the washer 116 so as to be held fixed therebetween.

As lens fixing means substitutable for the washer 116, for example, an annular member equipped with an outer screw that screws to the inner circumferential surface of the lens barrel may be used.

Generally, the decentered lens is not uniform in thickness of the lens around the circumference, making it impossible to hold such a lens to the lens barrel by a conventional holding technique for axisymmetrical lenses. However, if the reference lens surface is determined and the centering axis is also determined as described above, and if an annular flat surface perpendicular to the centering axis is formed, then, a decentered lens can be easily held inside the lens barrel in such a way that its axial movement is restricted, no matter what types the decentered lens belongs to.

Figure 9:
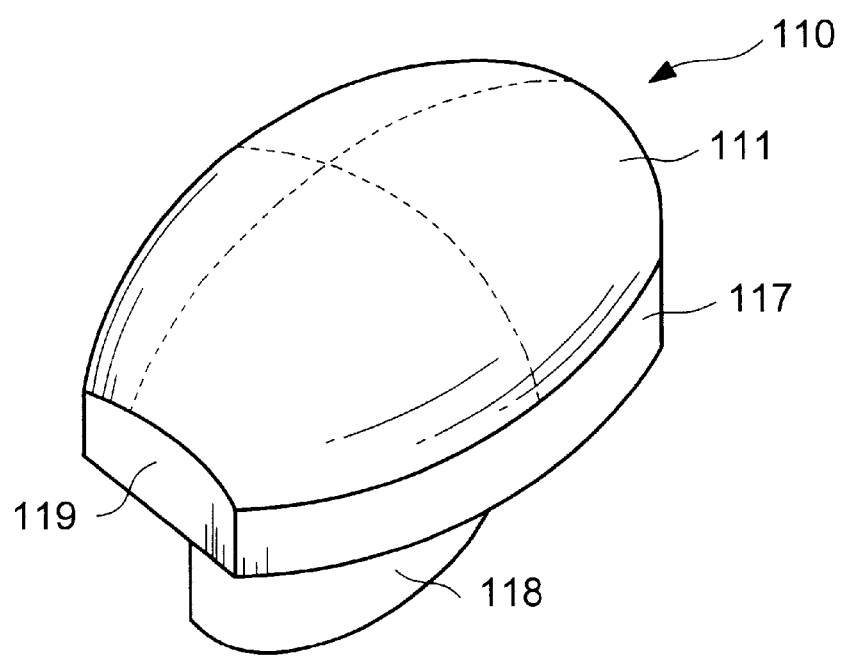
FIG. 9 is a perspective view showing a decentered lens which is used in a holding structure for the decentered lens according to a sixth embodiment of the present invention.

FIG. 9 is a perspective view of a decentered lens 110 which is used in a holding structure, as shown in FIG. 8, for the decentered lens according to a sixth embodiment of the present invention, where the decentered lens 110 is viewed from a side of the first lens surface 111. A side surface around the first lens surface 111 is formed as a first cutting surface 117, and a side surface around a smaller diameter portion which is formed step-like relative to the first cutting surface 111 is formed as a second cutting surface 118. Although not shown, the aforementioned annular flat surface 114 is formed between the first cutting surface 117 and the second cutting surface 118. The first cutting surface 117 has a rotation inhibiting portion 119 which is formed into a flat surface by being cut out as shown in the figure.

Figure 10:
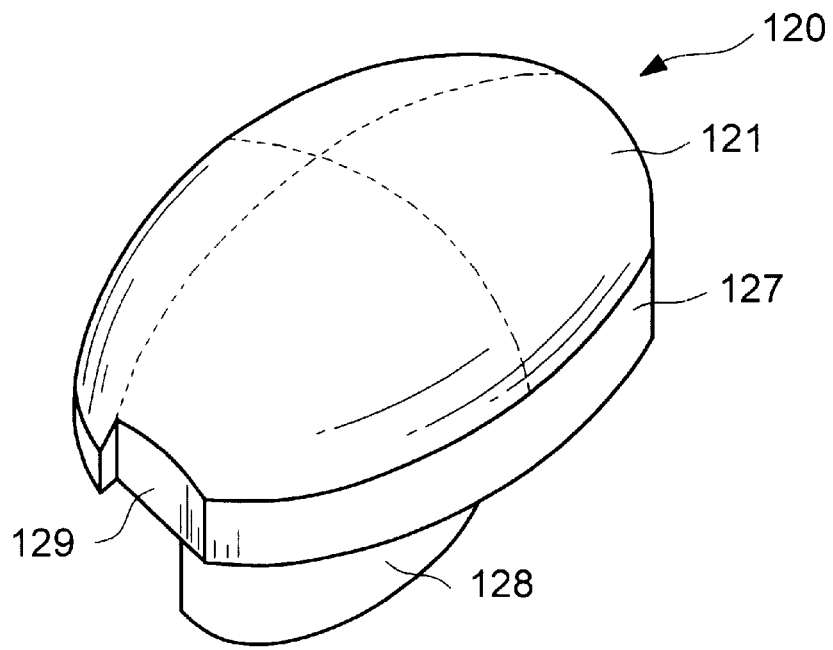
FIG. 10 is a perspective view showing a decentered lens which is used in a holding structure for the decentered lens according to a seventh embodiment of the present invention.

Alternatively, this rotation inhibiting portion may be so formed into a hook-shaped cut-out surface 129 that its corner part of the cut-out is formed to be generally right-angled, as shown in FIG. 10 as a decentered lens 120 used in a structure for the decentered lens according to a seventh embodiment of the present invention. In FIG. 10, reference numeral 121 denotes a first lens surface, 127 denotes a first cutting surface, and 128 denotes a second cutting surface.

Figure 11:
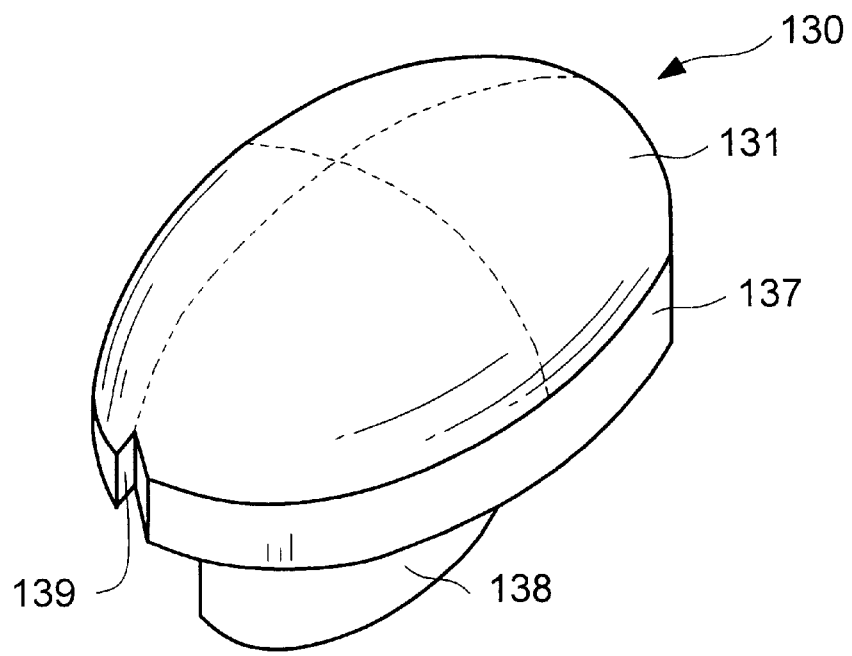
FIG. 11 is a perspective view showing a decentered lens which is used in a holding structure for the decentered lens according to a eighth embodiment of the present invention.

Alternatively, the rotation inhibiting portion may be so formed into a wedge-shaped cut-out surface 139, as shown in FIG. 11 as a decentered lens 130 used in a structure for the decentered lens according to a eighth embodiment of the present invention. Otherwise, although its cross sectional shape thereof is not specified herein, the rotation inhibiting portion may be formed into a recess equivalent to the wedge-shaped cut-out. In FIG. 11, reference numeral 131 denotes a first lens surface, 137 denotes a first, and 138 denotes a second cutting surface.

Figure 12:
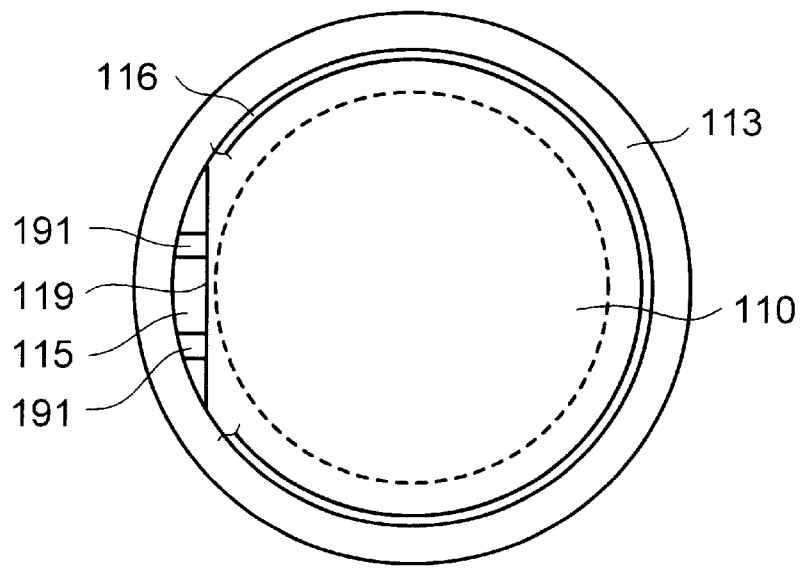
FIG. 12 is a view shown from a direction indicated by the arrow A100 in FIG. 8 in case that the decentered lens of FIG. 9 is mounted on a lens barrel with a state as shown in FIG. 8.

FIG. 12 shows a construction in which the decentered lens 110 of FIG. 9 is assembled to the lens barrel 113 of FIG. 8, as viewed in the direction of arrow A100 of FIG. 8. The washer 116 is illustrated as partly broken. As shown in the broken part, two projections 191 extend from the inner circumferential surface of the lens barrel 113 into contact with the rotation inhibiting portion 119 of the decentered lens 110. This structure restricts or prevents the turning or rotation of the decentered lens 110 relative to the lens barrel 113.

Alternatively, the projections 191 extending from the inner circumferential surface of the lens barrel 113 may be substituted by two pins (not shown) which are projected axially from the lens receiver 115 of the lens barrel 113 toward the first lens surface 111 into contact with the rotation inhibiting portion 119.

Alternatively, instead of the above projections or pins, there may be provided a projecting part (not shown), complementary in shape with respect to the configuration cut out from the rotation inhibiting portion 119, which projects from the inner circumferential surface of the lens barrel 113 or from the lens receiver 115. The projecting part is fitted to the cut-out surface 119 of the decentered lens 110, thereby inhibiting or preventing the decentered lens 110 from rotating relative to the lens barrel 113. If a screw is used in place of the pin, the screw functions a rotation adjusting mechanism.

Figure 13:
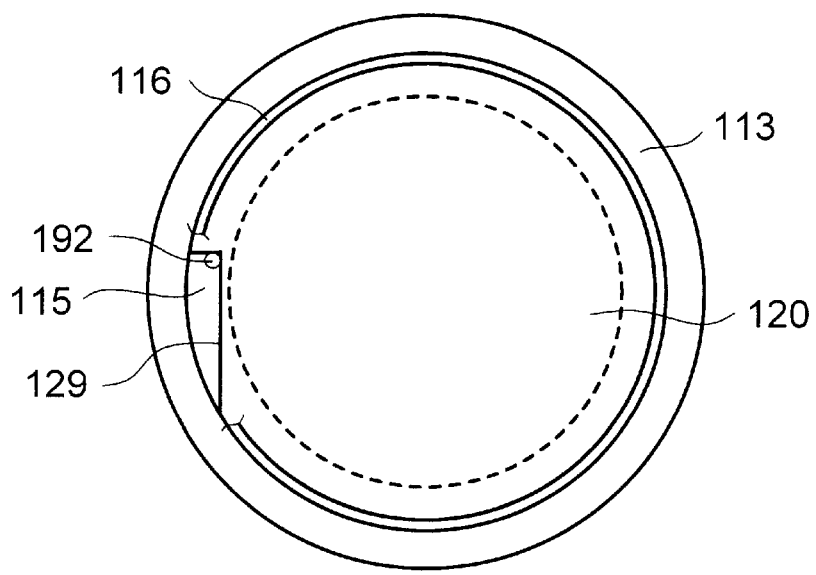
FIG. 13 is a view shown from a direction indicated by the arrow A100 in FIG. 8 in case that the decentered lens of FIG. 10 is mounted on a lens barrel with a state as shown in FIG. 8.

FIG. 13 shows a construction in which the decentered lens 120 of FIG. 10 is assembled to the lens barrel 113 of FIG. 8, as viewed in the direction of arrow A100 of FIG. 8. The washer 116 is illustrated as partly broken. As shown in the figure, a pin 192 projects from the lens receiver 115 of the lens barrel 113 axially towards first lens surface 121 into contact with a rotation inhibiting portion 129 of the decentered lens 120. This structure is effective in restricting or preventing the rotation or turning of the decentered lens 120 particularly in the counterclockwise direction in the figure. For example, in case that a screwed ring is used in place of the washer 116, the structure is also effective for a construction in which the ring is screwed in by being turned clockwise in the figure. When the washer is turned clockwise, the lens is also likely to turn clockwise. Therefore, when the lens is fixed by turning the washer clockwise, the lens is restricted from turning clockwise. If the surface being prevented from turning or rotating includes the centering axis, influence caused by a tolerance or error in processing or machining is minimized.

Figure 14:
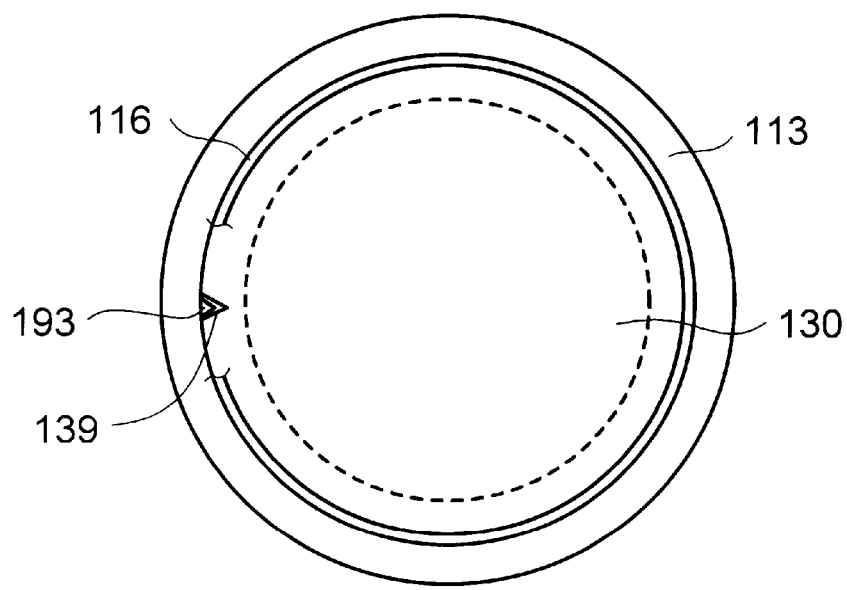
FIG. 14 is a view shown from a direction indicated by the arrow A100 in FIG. 8 in case that the decentered lens of FIG. 11 is mounted on a lens barrel with a state as shown in FIG. 8.

FIG. 14 shows a construction in which the decentered lens 130 of FIG. 11 is assembled to the lens barrel 113 of FIG. 8, as viewed in the direction of arrow A100 of FIG. 8. The washer 116 is illustrated as partly broken. As shown in the figure, a protrusion 193 which protrudes from the inner circumferential surface of the lens barrel 113, is fitted to a wedged rotation inhibiting portion 139 of the decentered lens 130. This structure prevents or restricts the turning of the decentered lens 130.

Figure 15:
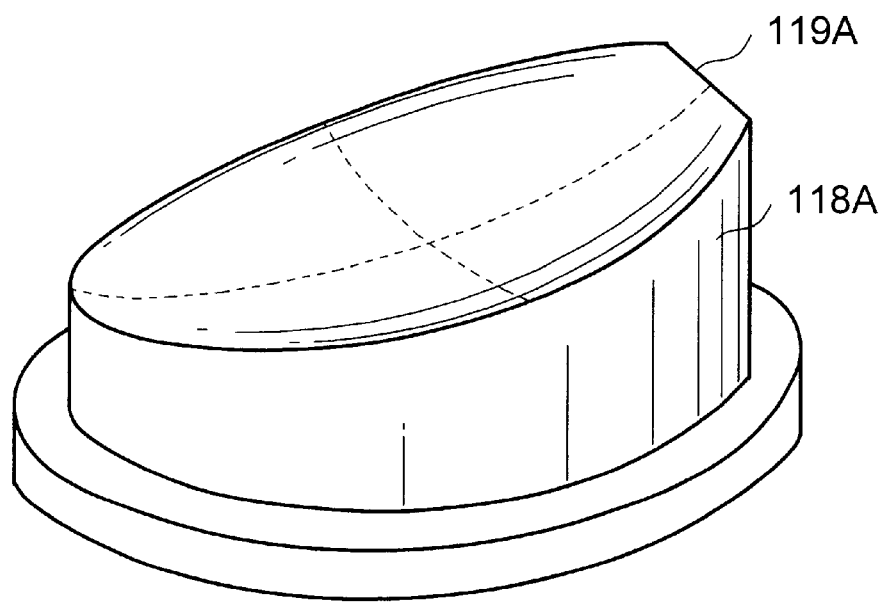
FIG. 15 is a perspective view showing a decentered lens which is used in a holding structure for the decentered lens according to a ninth embodiment of the present invention.
Figure 16:
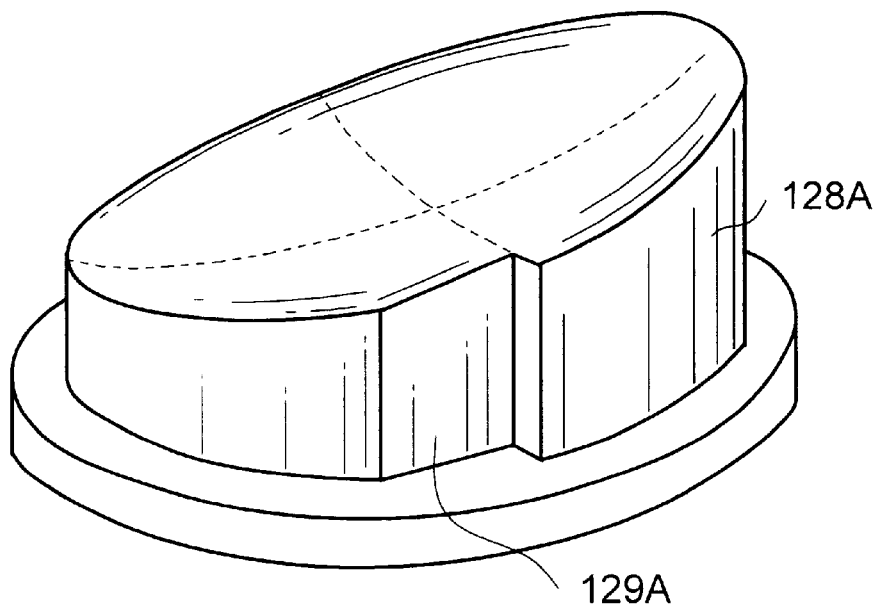
FIG. 16 is a perspective view showing a decentered lens which is used in a holding structure for the decentered lens according to a tenth embodiment of the present invention.
Figure 17:
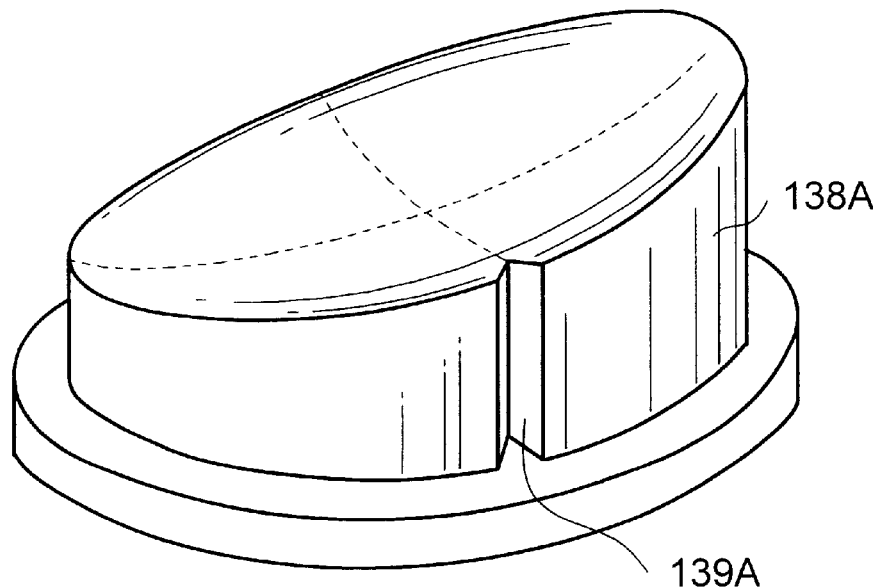
FIG. 17 is a perspective view showing a decentered lens which is used in a holding structure for the decentered lens according to an eleventh embodiment of the present invention.

The rotation inhibiting portions 119, 129 and 139 are formed in the first cutting surfaces 117, 127 and 137 of the decentered lenses 110, 120 and 130 in the above examples; alternatively, it is also possible to form similar rotation inhibiting portions 119A, 129A and 139A in the second cutting surfaces 118A, 128A and 138A, as shown in FIGS. 15 to 17. Also, similar projections, pins or protrusions corresponding to these rotation inhibiting portions may be formed in the lens barrel.

According to the holding structure for the decentered lens of the sixth through eleventh embodiments of the present invention, any decentered lens is easy to be held relative to the lens barrel, and the decentered lens is easy to be held relative to the lens barrel with the lens being prevented from rotating with respect to the lens barrel.

Figure 18:
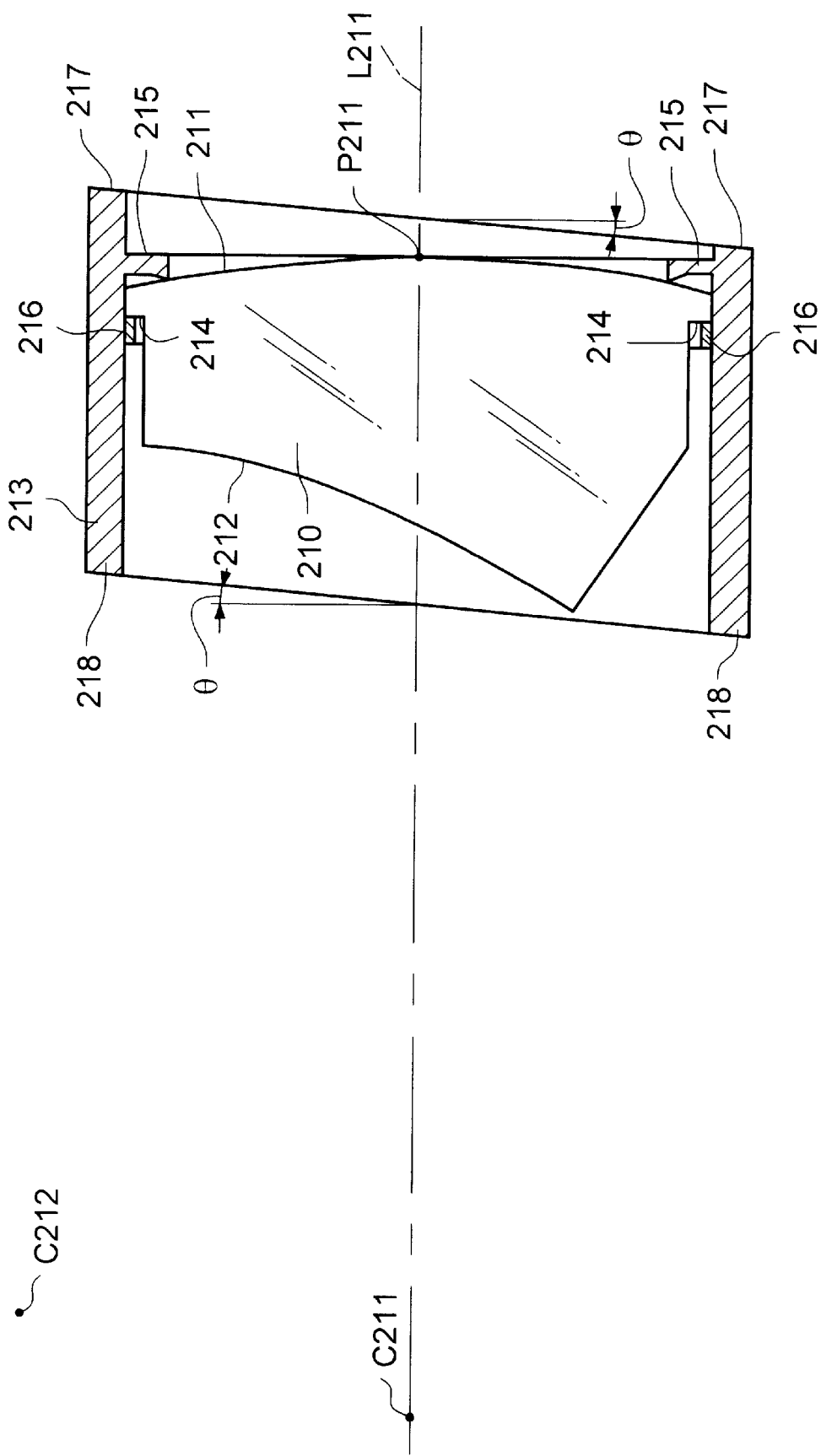
FIG. 18 is a sectional view showing a lens barrel for a decentered lens according to a twelfth embodiment of the present invention.
Figure 20:
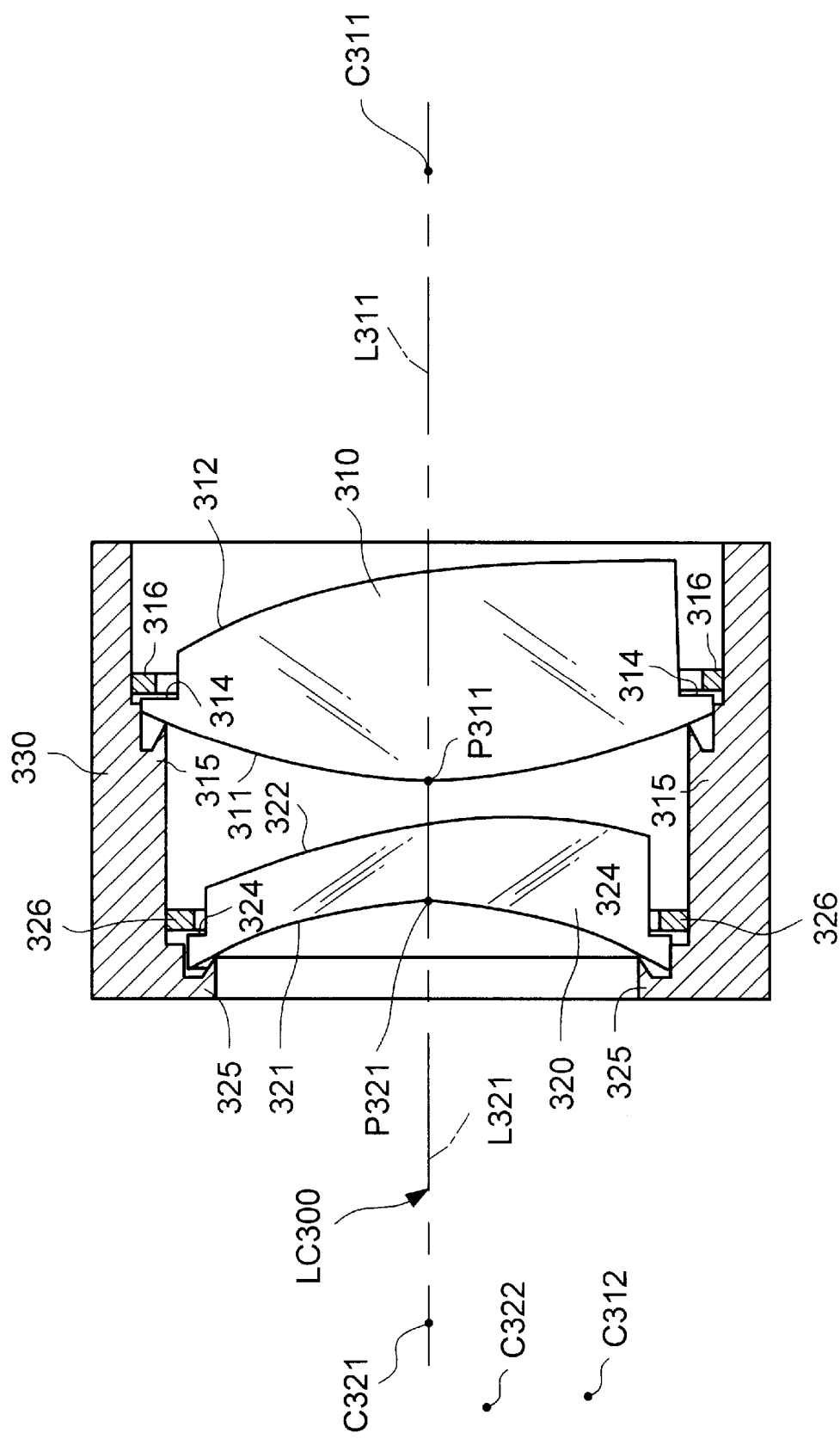
FIG. 20 is a sectional view showing a holding structure for a decentered lens according to a thirteenth embodiment of the present invention.

FIG. 18 shows a lens barrel for a decentered lens according to a twelfth embodiment of the present invention. Referring to FIG. 20, a reference numeral 210 denotes a decentered lens, which has a first lens surface 211 formed as a convex curved surface, and a second lens surface 212 formed as a concave curved surface. The centers of curvature of the first lens surface 211 and the second lens surface 212 are points C211 and C212, respectively. Their suffixed numerals correspond to the reference numerals of the lens surfaces, respectively. For this decentered lens 210, a centering axis L211 is determined with the first lens surface 211 taken as a reference lens surface; that is, the centering axis L211 is given by a line that connects a center point P211 and the center of curvature C211 of the first lens surface 211 with each other. This centering axis L211 corresponds to the axis of a cylindrical-shaped lens barrel 213 that holds the decentered lens 210. The center of curvature C212 of the second lens surface 212, which has not been taken as the reference, is positioned out of the centering axis L211.

The decentered lens 210 has a step-like peripheral surface which is formed by removing a peripheral part thereof on a side of the second lens surface 212 from the second lens surface 212 towards the first lens surface 211 in a direction parallel to the centering axis L211, so that a flat annular surface 214 is formed around in a radial direction so as to form a recessed surface with respect to the second lens surface 212. This annular flat surface 214 is located within a plane perpendicular to the centering axis L211. Therefore, the annular flat surface 214 is axisymmetrical with respect to the centering axis L211. Also, the first lens surface 211, whose center of curvature C211 is located on the centering axis L211, is axisymmetrical with respect to the centering axis L211. As explained above, the lens 210, being a decentered lens, has two axisymmetrical surfaces directed oppositely to each other so that the lens 210 is pinched in a direction of its thickness at the periphery, as in the case where an axisymmetrical lens is held in the lens barrel in an ordinary way. It is noted that the removing part may be either removed by grinding or other machining processes, or that the step-like surface of the lens may be formed initially in the molding process.

In the lens barrel 213, a circular lens receiver 215 is formed so as to protrudes inwardly and radially from the inner circumferential surface thereof. In this twelfth embodiment, a peripheral portion of the first lens surface 211 of the decentered lens 210 is supported by the lens receiver 215. Also, a fixing washer 216 contacts with the annular flat surface 214. The washer 216, while contacting with the annular flat surface 214 in such a way that the lens 210 is pressed against the lens receiver 215, is fixed to the lens barrel 213, so that the decentered lens 210 is pinched between the lens receiver 215 of the lens barrel 213 and the washer 216 so as to be held fixed therebetween.

As lens fixing means substitutable for the washer 216, for example, an annular member equipped with an outer screw that screws to the inner circumferential surface of the lens barrel 213 may be used.

End faces 217 and 218 around the openings at both axial ends of the lens barrel 213 are inclined by an angle "theta" with respect to an axis perpendicular to an axis of the lens barrel 213 or the centering axis L211.

Generally, the decentered lens is not uniform in thickness of the lens around the circumference, making it impossible to hold such a lens to the lens barrel by conventional holding techniques for axisymmetrical lenses. However, if the reference lens surface is determined and the centering axis is determined as described above, and if an annular flat surface perpendicular to the centering axis is formed, then a decentered lens can be easily held in the lens barrel in such a way that its axial movement is restricted, no matter what kinds of decentered lenses may be used.

Figure 19:
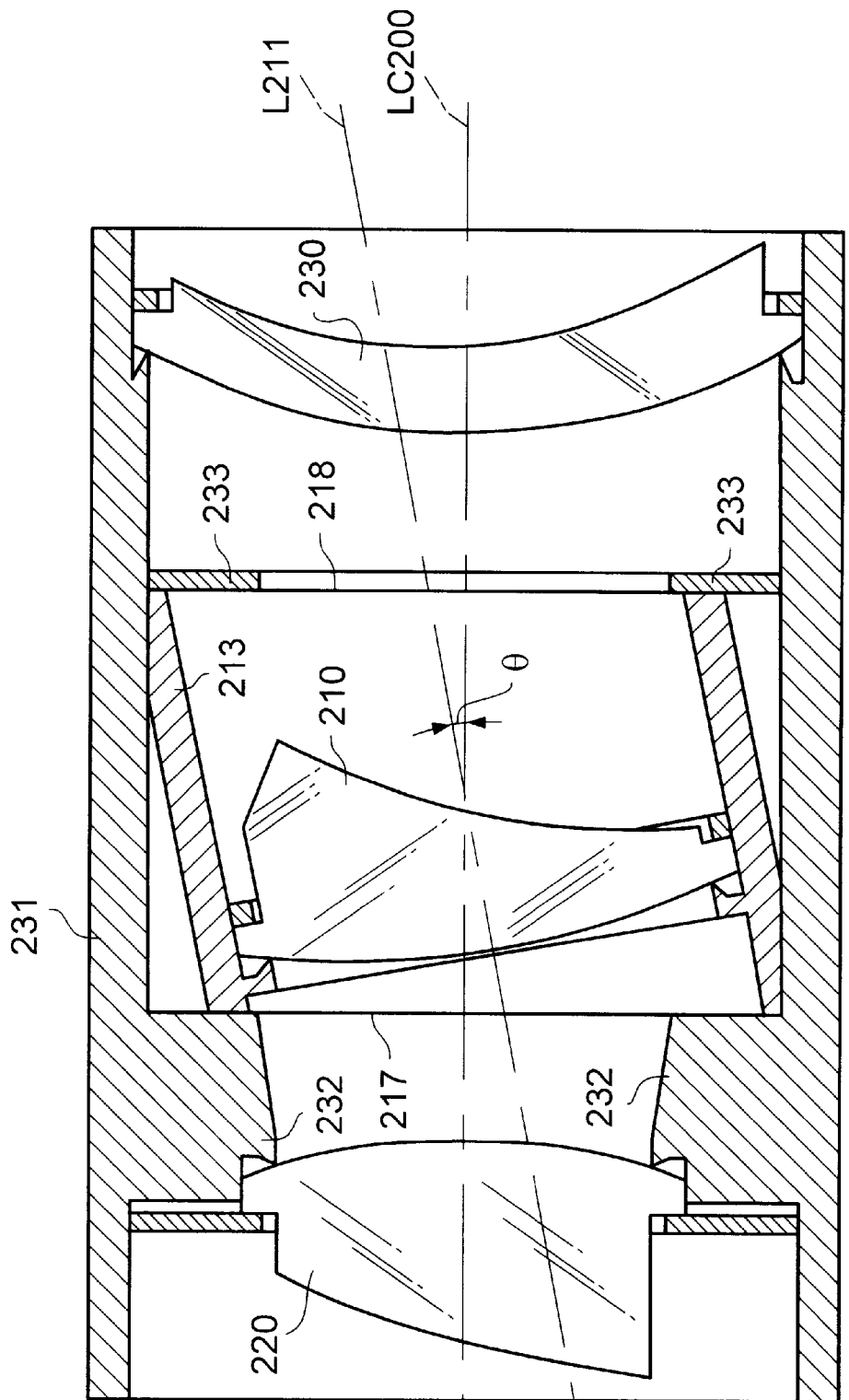
FIG. 19 is a sectional view showing a construction for holding a plurality of lens in which the lens barrel for the decentered lens of FIG. 18 is used.

FIG. 19 is a side view showing a construction in which the decentered lens 210 (hereinafter, referred to as a second lens) of FIG. 18 is placed between a lens 220 (hereinafter, referred to as a first lens) and a lens 230 (hereinafter, referred to as a third lens). The first lens 220 and the third lens 230 are fixedly held to a common lens barrel 231 (hereinafter, referred to as a first lens barrel), having a centering axis LC200. The second lens 210 is held inside the second lens barrel 213 (hereinafter, referred to as a second lens barrel) which is held inside the first lens barrel 231 with the centering axis L211 of the second lens barrel 213 tilting relative to the centering axis LC200 of the first lens barrel 231. The tilting angle between the two centering axes L211 and LC200 is an angle "theta" as shown in FIG. 19. This tilting angle or inclination angle "theta" is an angle that is determined or set, based on the design of the whole optical system including the first to third lens 210, 220, 230. Both end faces 217, 218 of the second lens barrel 213 are formed so as to conform to the angle.

A reference numeral 232 in the figure denotes an annular projection which supports the first lens 220, and also supports the second lens barrel 213 by making its end face 217 of the second lens barrel 213 contact the annular projection 232.

Meanwhile, a reference numeral 233 denotes an annular fixing plate which contacts with the end face 218 of the second lens barrel 213 so as to press the second lens barrel 213 against the annular projection 232. The annular fixing plate 233 is fixed to the inner circumferential surface of the first lens barrel 231.

With the above constitution, the second lens barrel 213 can be easily assembled to the first lens barrel 231 as with ordinary axisymmetrical lenses. Also, with the above constitution, it is easy to construct an optical system in which the centering axis of a particular lens is inclined with respect to the centering axis of another lens.

According to the lens barrel for the decentered lens of the twelfth embodiment of the present invention, both of the end surfaces of the lens barrel are formed tilting with respect to an axis perpendicular to the axis of the lens barrel, in a type of lens barrel the axis of which corresponds to the centering axis of the lens accommodated therein. Therefore, it is easy to assemble the lens barrel into an optical system including a plurality of lenses, by tilting the centering axis of the decentered lens held by the lens barrel relative to a common centering axis of the plurality of lenses in the optical system by a predetermined amount.

FIG. 20 is a sectional view of a holding structure for a pair of decentered lenses according to a thirteenth embodiment of the present invention. Referring to FIG. 20, a reference numeral 310 denotes a first decentered lens, which has a first lens surface 311 and a second lens surface 312, each formed as a convex curved surface. The centers of curvature of the first lens surface 311 and the second lens surface 312 are points C311 and C312, respectively. Their suffixed numerals correspond to the reference numerals of the lens surfaces, respectively. For this first decentered lens 310, a centering axis is determined with the first lens surface 311 taken as a reference lens surface; that is, the centering axis L311 is given by a line that connects a center point P311 and the center of curvature C311 of the first lens surface 311 with each other.

In the figure, a reference numeral 320 denotes a second decentered lens, which has a third lens surface 321 formed as a concave curved surface, and a fourth lens surface 322 formed as a convex curved surface. The centers of curvature of the third lens surface 321 and the fourth lens surface 322 are points C321 and C322, respectively. For the second decentered lens 320, a centering axis is determined with the third lens surface 321 taken as a reference lens surface; that is, the centering axis L321 is given by a line that connects a center point P321 and the center of curvature C321 of the third lens surface 321 with each other. As shown in the figure, the centering axes L311 and L321 (hereinafter, referred to as a common centering axis LC300) of the first decentered lens 310 and the second decentered lens 320, respectively, correspond to each other, and this common centering axis also correspond to the axis of a lens barrel 330 that holds these decentered lenses 310, 320, respectively.

The center of curvature C312 of the second lens surface 312 being not taken as the reference surface, and the center of curvature C322 of the fourth lens surface 322 being not taken as the reference surface, are positioned out of the common centering axis LC300.

In the thirteenth embodiment, the common centering axis LC300 is given by a line that connects the center of curvature C311 of the first lens surface 311 and the center of curvature C321 of the third lens surface 321. Actually, however, there exist four centers of curvatures for four lens surfaces, so that the common centering axis can be set in four ways by a line that is set by connecting one center of curvature selected from one decentered lens and another center of curvature selected from the other decentered lens with each other, theoretically. Then, a common centering axis can be determined, depending on the characteristics and needs of the individual optical systems.

For example, out of the four lines, one particular line that minimizes the distance between the outermost two points where the particular line of the four and the second lens surface 312 intersect with each other, and the particular one line thereof and the third lens surface 321 intersect with each other, can be selected as a common centering axis to allow the optical system including these two decentered lenses to be of the smallest size.

Further, out of the four lines, one particular line that minimizes the greatest of four angles formed by the four normal lines of the four lens surfaces and the particular line can be selected as a common centering axis to allow the accuracy in assembling the optical system to be enhanced.

Further, out of two lens surfaces of each decentered lens, if one lens surface thereof is such that its optical accuracy itself largely affects the performance of the whole optical system, i.e., high in error sensitivity, and if the other lens surface is such that the optical accuracy itself does not affect so much, i.e., low in error sensitivity, then taking as the common centering axis a line that connects the centers of curvature of the lens surfaces that are high in error sensitivity of the decentered lenses with each other, allows the accuracy in assembling the whole optical system to be enhanced.

The decentered lens 310 has a step-like peripheral surface which is formed by removing a peripheral part thereof on a side of the second lens surface 312 from the second lens surface 312 towards the first lens surface 311 in a direction parallel to the centering axis L311, so that a flat annular surface 314 is formed around in a radial direction so as to form a recessed surface with respect to the second lens surface 312. This annular flat surface 314 is located within a plane perpendicular to the centering axis L311. Therefore, the annular flat surface 314 is axisymmetrical with respect to the centering axis L311. Also, the first lens surface 311, whose center of curvature C311 is located on the centering axis L311, is axisymmetrical with respect to the centering axis L311. As explained above, the lens 310, being a decentered lens, has two axisymmetrical surfaces directed oppositely to each other in order that the lens is pinched in a direction of its thickness at the peripheral portion, as in the case where a conventional axisymmetrical lens is held in the lens barrel in an ordinary way.

Similarly, the decentered lens 320 has a step-like peripheral surface which is formed by removing a peripheral part thereof on a side of the fourth lens surface 322 from the fourth lens surface 322 towards the third lens surface 321 in a direction parallel to the centering axis L311, so that a flat annular surface 324 is formed around in a radial direction so as to form a recessed surface with respect to the fourth lens surface 322.

The second annular flat surface 324 is located within a plane perpendicular to the centering axis L321. Therefore, the second annular flat surface 324 is also axisymmetrical with respect to the centering axis L321. Also, the third lens surface 321, whose center of curvature C321 is located on the centering axis L321, is axisymmetrical with respect to the centering axis L321.

As explained above, the first and second lenses 310 and 320 are decentered lenses, and each decentered lens has two axisymmetrical surfaces directed oppositely to each other, so that each lens is pinched in a direction of each thickness at the peripheries, as in the case where two axisymmetrical lenses are held in the lens barrel in an ordinary way.

Further, since the two centering axes L311, L321 are given as a common axis LC300, the two decentered lenses 310, 320 can be positioned on the common centering axis LC300, the arrangement of which is the same as the arrangement for two axisymmetrical lenses.

It is noted that the removing part may be either removed by grinding or other machining processes, or that the step-like surface of the lens may be formed initially in the molding process.

In the lens barrel 330, a circular first lens receiver 315 and a circular second lens receiver 325 are formed so as to protrude inwardly and radially from the inner circumferential surface. The first lens surface 311, which is the reference lens surface of the first decentered lens 310, is supported at its peripheral portion by the first lens receiver 315. Also, a first fixing washer 316 contacts with the first annular flat surface 314. The first washer 316, while contacting with the first annular flat surface 314 in such a way that the first decentered lens 310 is pressed against the first lens receiver 315, is fixed to the lens barrel lens barrel 330, so that the first decentered lens 310 is pinched between the first lens receiver 315 of the lens barrel 330 and the first washer 316 so as to be held fixed therebetween.

Alternatively, as lens fixing means substitutable for the washer 316, for example, an annular member equipped with an outer screw that screws to the inner circumferential surface of the lens barrel may be used.

Further, in the lens barrel 330, is formed a second lens receiver 325 independently of the first lens receiver 315. While the first decentered lens 310 is fixedly held by the first lens receiver 315, the second decentered lens 320 is supported by the second lens receiver 325. It is a second fixing washer 326 that contacts with the second annular flat surface 324 of the second lens 320.

With the above constitution, even the two decentered lenses 310 and 320 can be simply held in one lens barrel 330, and also an easy assembling process can be realized.

According to the holding structure for a pair of decentered lenses of the thirteenth embodiment of the present invention, the common centering axis of a pair of decentered lenses is set to be a straight line which connects voluntary one of two centers of curvature of one decentered lens and voluntary one of two centers of curvature of the other decentered lens, so as to correspond to the axis of one lens barrel. With the construction, the pair of decentered lenses are held or supported in the one lens barrel so that the pair of decentered lenses precisely functions in an optical system.

Figure 21:
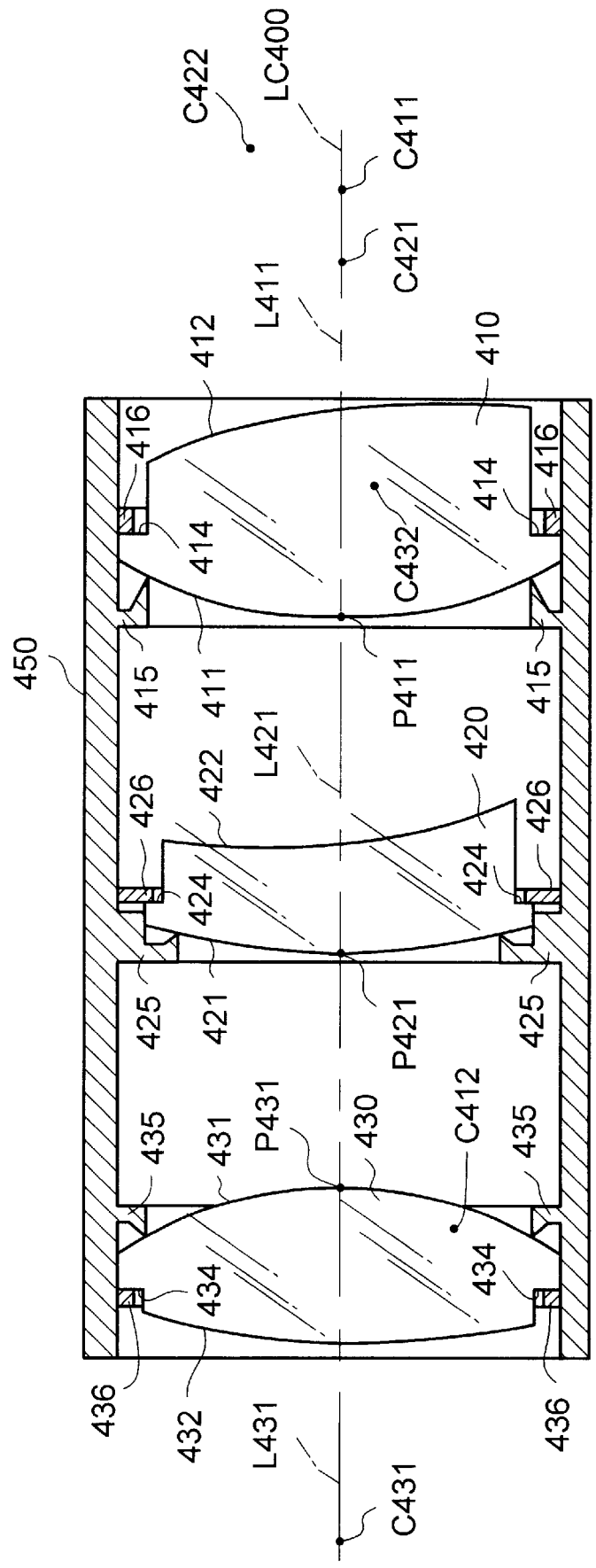
FIG. 21 is a sectional view showing a holding structure for a decentered lens according to a fourteenth embodiment of the present invention.

FIG. 21 is a sectional view of a holding structure for three or more decentered lenses according to a fourteenth embodiment of the present invention.

Referring to FIG. 21, a reference numeral 410 denotes a first decentered lens, which has a first lens surface 411 and a second lens surface 412, each formed as a convex curved surface. The centers of curvature of the first lens surface 411 and the second lens surface 412 are points C411 and C412, respectively. Their suffixed numerals correspond to the reference numerals of the lens surfaces, respectively.

For this first decentered lens 410, a centering axis is determined with the first lens surface 411 taken as a reference lens surface; that is, the centering axis L411 is given by a line that connects a center point P411 and the center of curvature C411 of the first lens surface 411 with each other.

In the figure, a reference numeral 420 denotes a second decentered lens, which has a third lens surface 421 given by a convex curved surface, and a fourth lens surface 422 given by a concave curved surface. The centers of curvature of the third lens surface 421 and the fourth lens surface 422 are points C421 and C422, respectively. For the second decentered lens 420, a centering axis is determined with the third lens surface 421 taken as a reference lens surface; that is, the centering axis L421 is given by a line that connects a center point P421 and the center of curvature C421 of the third lens surface 421 with each other.

In the figure, a reference numeral 430 denotes a third decentered lens, which has a fifth lens surface 431 and a sixth lens surface 432, each given by a convex curved surface. The centers of curvature of the fifth lens surface 431 and the sixth lens surface 432 are points C431 and C432, respectively. For the third decentered lens 430, a centering axis is determined with the fifth lens surface 431 being taken as a reference lens surface; that is, the centering axis L431 is given by a line that connects a center point P431 and the center of curvature C431 of the fifth lens surface 431 with each other.

As shown in the figure, the centering axes L411, L421 and L431 (hereinafter, referred to as a common centering axis LC400) of the first decentered lens 410, the second decentered lens 420 and the third decentered lens 430, respectively, correspond to each other, and this common centering axis LC400 correspond to the axis of a cylindrical lens barrel 450 that holds these first, second and third decentered lenses 410, 420, 430 therein. The second lens surface 412, the fourth lens surface 422, and the sixth lens surface 432, are not taken as reference lens surfaces, respectively; and the center of curvature C412 of the second lens surface 412, the center of curvature C422 of the fourth lens surface 422, and the center of curvature C432 of the sixth lens surface 432, are positioned out of the common centering axis LC400.

As to the holding of three decentered lenses, it would be difficult to assemble the optical system if trying to coincide all the centering axes of the three decentered lenses at one time. However, the assembling thereof can be made easily if thinking as follows: That is, with regard to two arbitrary decentered lenses out of three, because there exist a total of four centers of curvature thereof with each lens having two centers of curvature, there can exist a total of four straight lines therebetween which are made by connecting arbitrary one of two centers of curvature of one decentered lens and arbitrary one of two centers of curvature of the other decentered lens. First, one of the four straight lines is arbitrarily selected, and is set to be a common centering axis for the two lenses. Next, a third decentered lens is so positioned with respect to the two decentered lenses that arbitrary one of two centers of curvature of the third decentered lens is located on the common centering axis. With these steps, the three decentered lenses can be easily arranged on one common centering axis.

The first decentered lens 410 has a step-like peripheral surface which is formed by removing a peripheral part thereof on a side of the second lens surface 412 from the second lens surface s12 towards the first lens surface 411 in a direction parallel to the centering axis LC400, so that a flat annular surface 414 is formed around in a radial direction so as to form a recessed surface with respect to the second lens surface 412.

This annular flat surface 414 is located within a plane perpendicular to the centering axis LC400. Therefore, the annular flat surface 414 is axisymmetrical with respect to the centering axis LC400. Also, the first lens surface 411, whose center of curvature C411 is located on the centering axis LC400, is axisymmetrical with respect to the centering axis LC400. As explained above, the lens 410, being a decentered lens, has two axisymmetrical surfaces directed oppositely to each other in order that the lens is pinched in a direction of its thickness at the peripheral portions, as in the case where a conventional axisymmetrical lens is held in the lens barrel in an ordinary way.

Similarly, the second decentered lens 420 has a step-like peripheral surface which is formed by removing a peripheral part thereof on a side of the fourth lens surface 422 from the fourth lens surface 422 towards the third lens surface 421 in a direction parallel to the centering axis LC400, so that a flat annular surface 424 is formed around in a radial direction so as to form a recessed surface with respect to the fourth lens surface 422.

This annular flat surface 424 is located within a plane perpendicular to the centering axis LC400. Therefore, the annular flat surface 424 is axisymmetrical with respect to the centering axis LC400. Also, the third lens surface 421, whose center of curvature C421 is located on the centering axis LC400, is axisymmetrical with respect to the centering axis LC400. As explained above, the lens 420, being a decentered lens, has two axisymmetrical surfaces directed oppositely to each other in order that the lens is pinched in a direction of its thickness at the peripheral portions, as in the case where a conventional axisymmetrical lens is held in the lens barrel in an ordinary way.

Similarly, the third decentered lens 430 has a step-like peripheral surface which is formed by removing a peripheral part thereof on a side of the sixth lens surface 432 from the sixth lens surface 432 towards the fifth lens surface 431 in a direction parallel to the centering axis LC400, so that a flat annular surface 434 is formed around in a radial direction so as to form a recessed surface with respect to the sixth lens surface 432.

This annular flat surface 434 is located within a plane perpendicular to the centering axis LC400. Therefore, the annular flat surface 434 is axisymmetrical with respect to the centering axis LC400. Also, the fifth lens surface 431, whose center of curvature C431 is located on the centering axis LC400, is axisymmetrical with respect to the centering axis LC400. As explained above, the lens 430, being a decentered lens, has two axisymmetrical surfaces directed oppositely to each other in order that the lens is pinched in a direction of its thickness at the peripheral portions, as in the case where a conventional axisymmetrical lens is held in the lens barrel in an ordinary way.

As explained above, the three lenses 410, 420 and 430 are all decentered lenses, and each of the lenses has two axisymmetrical surfaces directed oppositely to each other in order that each lens is pinched in a direction of its thickness at the periphery, as in the case where three axisymmetrical lenses are held in the lens barrel in an ordinary way. Also, because the three centering axes L411, L421, L431 are on a common axis LC400, the three decentered lenses 410, 420 and 430 can be positioned on the common centering axis LC400. This arrangement is also similar to the case where three axisymmetrical lenses are positioned.

It is noted that the removing part may be either removed by grinding or other machining processes, or that the step-like surface of the lens may be formed initially in the molding processes.

In the lens barrel 450, a circular first lens receiver 415 is formed so as to protrude inwardly and radially from the inner circumferential surface. The first lens surface 411, which is the reference lens surface of the first decentered lens 410, is supported at its peripheral portion by the first lens receiver 415. Also, a first fixing washer 416 contacts with the first annular flat surface 414. The first washer 416, while contacting with the first annular flat surface 414 in such a way that the first decentered lens 410 is pressed against the first lens receiver 415, is fixed to the lens barrel 450, so that the first decentered lens 410 is pinched between the first lens receiver 415 of the lens barrel 450 and the first washer 416 so as to be held fixed therebetween. As lens fixing means substitutable for the washer 416, for example, an annular member equipped with an outer screw that screws to the inner circumferential surface of the lens barrel may be used.

Also, in the lens barrel 450, is formed a second lens receiver 425 and a third lens receiver 435 independently of the first lens receiver 415. As the first decentered lens 410 is fixedly held by the first lens receiver 415, the second decentered lens 420 is supported by the second lens receiver 425, and the third decentered lens 430 is supported by the third lens receiver 435. It is a second fixing washer 426 that contacting with the second annular flat surface 424 of the second lens 421, and it is a third fixing washer 436 that contacts with the third annular flat surface 434 of the third lens 430.

With the above constitution, even three or more decentered lenses can be fixedly held in one lens barrel easily with the following steps of:

(1) first, determining each centering axis of each decentered lens, then (2) determining a common centering axis which each axis of each decentered lens corresponds to or overlaps over, then (3) making the common centering axis with an axis of a lens barrel inside which all the decentered lenses are installed.

According to the holding structure for more than three decentered lenses of the fourteenth embodiment of the present invention, in respect of two decentered lenses which are arbitrarily selected from more than the three decentered lenses, because there exist a total of four centers of curvature thereof with each lens having two centers of curvature, there can exist a total of four straight lines therebetween which are made by connecting arbitrary one of two centers of curvature of one decentered lens and arbitrary one of two centers of curvature of the other decentered lens. Consequently, first, one of the four straight lines is arbitrarily selected, and is set to be a common centering axis for the two lenses. Then, all the remaining decentered lens(es) is/are so positioned with respect to the first two decentered lenses that arbitrary one(s) of the two centers of curvature of the remaining decentered lens (es) is/are located on the common centering axis. And then, the common centering axis is made to coincide with an axis of the lens barrel inside which all the decentered lenses are installed. All the decentered lenses thus held in the lens barrel accurately function in the optical system.

Figure 22:
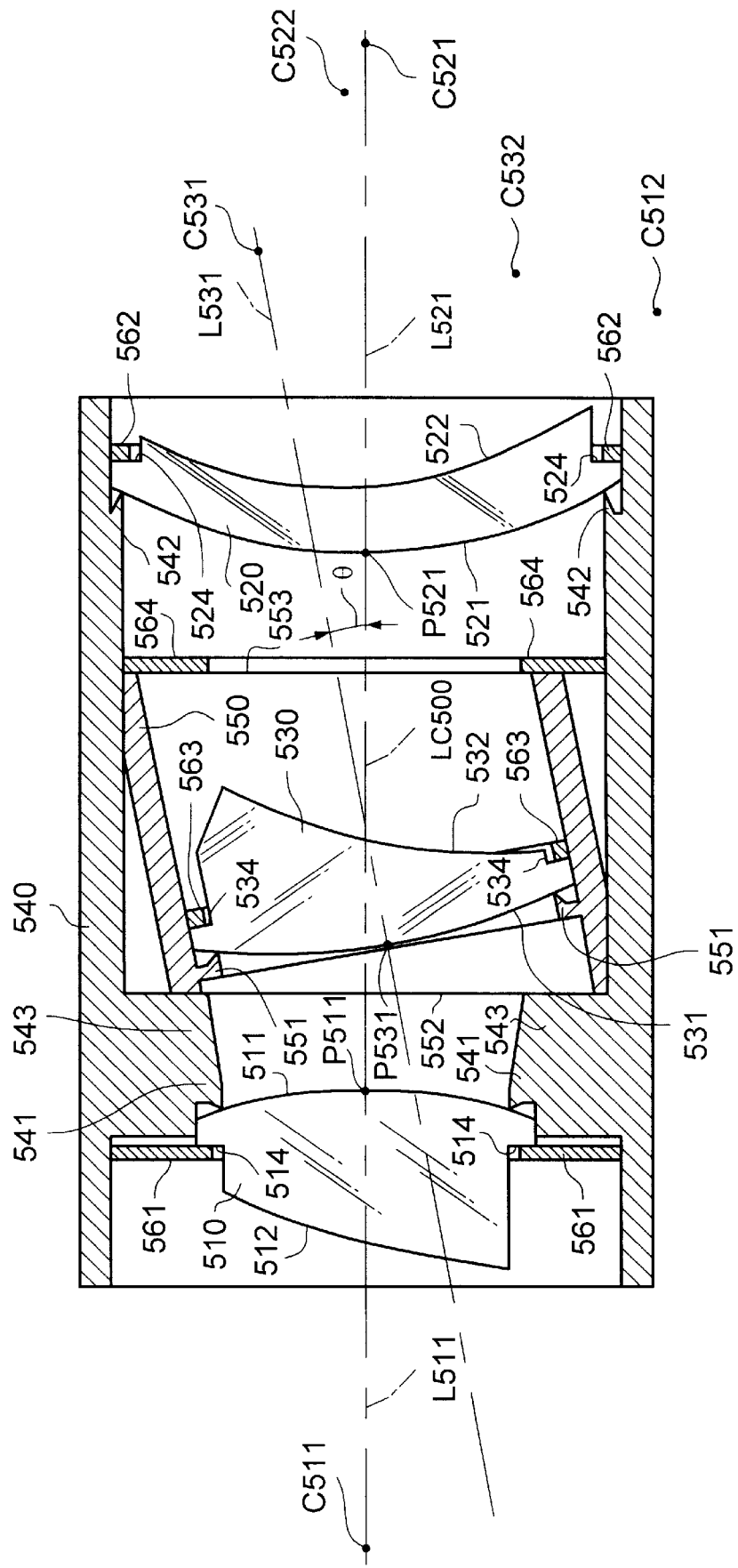
FIG. 22 is a sectional view showing a holding structure for a decentered lens according to a fifteenth embodiment of the present invention.

FIG. 22 is a sectional view of a holding structure for three decentered lenses according to a fifteenth embodiment of the present invention.

Referring to FIG. 22, a reference numeral 510 denotes a first decentered lens, 520 denotes a second decentered lens, 530 denotes a third decentered lens, 540 denotes a first lens barrel, and 550 denotes a second lens barrel.

The first decentered lens 510 has a first lens surface 511 and a second lens surface 512, each formed as a convex curved surface. The centers of curvature of the first lens surface 511 and the second lens surface 512 are points C511 and C512, respectively. Their suffixed numerals correspond to the reference numerals of the lens surfaces, respectively. For the first decentered lens 510, a centering axis is determined with the first lens surface 511 taken as a reference lens surface; that is, the centering axis L511 is given by a line that connects a center point P511 and the center of curvature C511 of the first lens surface 511 with each other.

The first decentered lens 510 has a step-like peripheral surface which is formed by removing a peripheral part thereof on a side of the second lens surface 512 from the second lens surface 512 towards the first lens surface 511 in a direction parallel to the centering axis C511, so that a flat annular surface 514 is formed around in a radial direction so as to form a recessed surface with respect to the second lens surface 512.

This first annular flat surface 514 is located within a plane perpendicular to the centering axis L511. Therefore, the first annular flat surface 514 is axisymmetrical with respect to the centering axis L511.

Also, the first lens surface 511, whose center of curvature C511 is located on the centering axis L511, is axisymmetrical with respect to the centering axis L511.

As explained above, the lens 510, being a decentered lens, has two axisymmetrical surfaces directed oppositely to each other in order that the lens is pinched in a direction of its thickness at the periphery, as in the case where an axisymmetrical lens is held in a lens barrel in an ordinary way.

It is noted that the removing part may be either removed by grinding or other machining processes, or that the step-like surface of the lens may be formed initially in the molding processes.

The second decentered lens 520 has a third lens surface 521 formed as a convex curved surface, and a fourth lens surface 522 formed as a concave curved surface. The centers of curvature of the third lens surface 521 and the fourth lens surface 522 are points C521 and C522, respectively. For the second decentered lens 520, a centering axis is determined with the third lens surface 521 taken as a reference lens surface; that is, the centering axis L521 is given by a line that connects a center point P521 and the center of curvature C521 of the third lens surface 521 with each other. The second decentered lens 520, like the first decentered lens 510, also has a step-like peripheral surface which is formed by removing a peripheral part thereof on a side of the fourth lens surface 522 from the fourth lens surface 522 towards the third lens surface 521 in a direction parallel to the centering axis L521, so that a flat annular surface 524 is formed around in a radial direction so as to form a recessed surface with respect to the fourth lens surface 522.

The second annular flat surface 524 is located within a plane perpendicular to the centering axis L521. Therefore, the second annular flat surface 524 is also axisymmetrical with respect to the centering axis L521.

Further, the third lens surface 521, whose center of curvature C521 is located on the centering axis L521, is axisymmetrical with respect to the centering axis L521.

As explained above, the lens 520 also has two axisymmetrical surfaces directed oppositely to each other in order that the lens is pinched a direction of its thickness at the periphery, as in the case where an axisymmetrical lens is held in a lens barrel in an ordinary way.

As shown in the figure, the centering axes L511 and L521 (hereinafter, referred to as common centering axis LC500) of the first decentered lens 510 and the second decentered lens 520, respectively, correspond with each other and with the common centering axis LC500, and this common centering axis LC500 corresponds with the axis of the first lens barrel 540. Thus, the center of curvature C512 of the second lens surface 512 that is not taken as the reference for the first decentered lens 510, and the center of curvature C522 of the fourth lens surface 522 that is not taken as the reference for the second decentered lens 520, are positioned out of the common centering axis LC500.

Inside the first lens barrel 540, a circular first lens receiver 541 and a second lens receiver 542 are formed so as to protrude inwardly and radially from the inner circumferential surface. In this fifteenth embodiment, the first lens surface 511 of the first decentered lens 510 is supported at its peripheral portion by the first lens receiver 541, while the third lens surface 521 of the second decentered lens 520 is supported at its peripheral portion by the second lens receiver 542.

A first fixing washer 561 contacting with the first annular flat surface 514 of the first decentered lens 510, while a second fixing washer 562 contacts with the second annular flat surface 524 of the second decentered lens 520. The first and second washers 561 and 562, while contacting with the annular flat surfaces 514 and 524 in such a way that the decentered lenses 510 and 520 are pressed against the lens receivers 541 and 542 respectively, are fixed to the lens barrel 540, so that the first and second decentered lenses 510 and 520 are pinched between the lens receivers 541, 542 of the lens barrel 540 and the washers 561, 562, respectively, so as to be fixedly held therebetween, respectively.

As lens fixing means substitutable for these washers 561, 562, for example, an annular member equipped with an outer screw that screws to the inner circumferential surface of the lens barrel may be used.

Generally, the decentered lens is not uniform in thickness over the circumference, making it impossible to hold such a lens to the lens barrel by conventional holding techniques for holding axisymmetrical lenses. However, if the reference lens surface and the centering axis are determined as described above, and if the annular flat surface perpendicular to the centering axis is formed, then a decentered lens, whatever it may be, can be easily held in the lens barrel in such a way that its axial movement is restricted or prevented.

The third decentered lens 530 has a fifth lens surface 531 formed as a convex curved surface, and a sixth lens surface 532 formed as a concave curved surface. The centers of curvature of the fifth lens surface 531 and the sixth lens surface 532 are points C531 and C532, respectively. For the third decentered lens 530, a centering axis is determined with the fifth lens surface 531 taken as a reference lens surface; that is, the centering axis L531 is given by a line that connects a center point P531 and the center of curvature C531 of the fifth lens surface 531 with each other. The third decentered lens 530, like the first decentered lens 510 and the second decentered lens 520, also has a step-like peripheral surface which is formed by removing a peripheral part thereof on a side of the sixth lens surface 532 from the sixth lens surface 532 towards the fifth lens surface 531 in a direction parallel to the centering axis L531, so that a third flat annular surface 534 is formed around in a radial direction so as to form a recessed surface with respect to the sixth lens surface 532.

The third annular flat surface 534 is located within a plane perpendicular to the centering axis L531. Therefore, the third annular flat surface 534 is also axisymmetrical with respect to the centering axis L531.

Further, the fifth lens surface 531, whose center of curvature C531 is located on the centering axis L531, is axisymmetrical with respect to the centering axis L531.

As explained above, the third decentered lens 530 also has two axisymmetrical surfaces directed oppositely to each other in order that the lens is pinched in a direction of its thickness at the periphery, as in the case where an axisymmetrical lens is held in a lens barrel in an ordinary way.

While the first decentered lens 510 and the second decentered lens 520 are fixedly held in the first lens barrel 540, the third decentered lens 530 is fixedly held in the second lens barrel 550 in such a way that its centering axis L531 corresponds with the axis of the second lens barrel 550. In the figure, a reference numeral 551 denotes a third lens receiver, and 563 denotes a third fixing washer.

As shown in the figure, the third decentered lens 530 is held within the second lens barrel 550 which in turn is held in the first lens barrel 540.

The end surfaces 552 and 553 around the openings at its axial both ends of the second lens barrel 550 are formed inclined or tilting with respect to the axis (in the figure, the axis corresponds to the centering axis L531) of the second lens barrel 550 itself. In the figure, a reference numeral 543 denotes an annular protrusion which supports the first decentered lens 510 by the first lens receiver 541 and also supports the second lens barrel 550 by contacting with its end face 552. A reference numeral 564 denotes an annular fixing plate which contacts with the end face 553 of the second lens barrel 550 so as to press the second lens barrel 550 against the annular protrusion 543. The annular fixing plate 564 is fixed to the inner circumferential surface of the first lens barrel 540. Because the contact surface of the annular protrusion 543 with which the end face 552 contacts is formed to be perpendicular to the axis L521 of the first lens barrel 540, the axis L531 of the second lens barrel 550 is inclined with respect to the axis L521 of the first lens barrel 540 by an amount "theta" which corresponds to an amount by which the end surfaces 552 and 553 around the openings of the second lens barrel 550 tilt relative to the axis L531 of the second lens barrel 550. The inclination angle in this embodiment is given by "theta" (see FIG. 22). Therefore, the centering axis L531 of the third decentered lens 530 tilts by the angle "theta" with respect to the common centering axis LC500 of the first decentered lens 510 and the second decentered lens 520, namely the axis of the first lens barrel 540. This inclination angle "theta" is an angle that is initially set or determined, based on the design of the whole optical system including the first to third decentered lenses 510, 520 and 530. Depending on this angle, both end faces 552 and 553 of the second lens barrel 550 are formed tilting.

With the above constitution, the second lens barrel 550 can be easily assembled into the first lens barrel 540 as with ordinary lenses.

Further, any optical system can be easily made up with the arrangement in which only the centering axis of a particular decentered lens is inclined with respect to the centering axis of other lenses.

In the above example, the centering axis of the third decentered lens positioned in the middle between the first and second decentered lens has been inclined with respect to the common centering axis of the first and second decentered lenses positioned at both ends. However, depending upon the location of the second lens barrel relative to the first lens barrel, the location at which a particular tilting decentered lens like the third decentered lens 530 in the fifteenth embodiment, can be arbitrarily selected.

In addition, although the holding structure for three decentered lenses according to the fifteenth embodiment of the present invention has been described in detail, the scope of the invention is never limited to the embodiment. For example, the same or similar technical concept can be applied to constructions in which more than three decentered lenses are to be held inside a single lens barrel.

According to the holding structure for three decentered lenses of the fifteenth embodiment of the present invention, in respect of two decentered lenses (i.e. first and second decentered lenses) which are arbitrarily selected from the three decentered lenses, because there exist a total of four centers of curvature thereof with each lens having two centers of curvature, there can exist a total of four straight lines therebetween which are made by connecting arbitrary one of two centers of curvature of one decentered lens and arbitrary one of two centers of curvature of the other decentered lens. Consequently, first, one of the four straight lines is arbitrarily selected, is set to be a common centering axis (i.e. first centering axis) for the two lenses, and is made to coincide with a first axis of a first lens barrel. Independently of the first and second lenses, a third lens out of the three is arranged inside a second lens barrel so that a centering axis (i.e. second centering axis) of the third lens coincides with a second axis of the second lens barrel. Then, the second lens barrel is so housed inside the first lens barrel that the second axis of the second lens barrel makes a predetermined angle with respect to the first axis of the first lens barrel, in order to realize a predetermined inclination of the second centering axis of the third lens relative to the first centering axis for the first and second decentered lenses. All the three decentered lenses thus held in the first lens barrel accurately function in the optical system.

Figure 23:
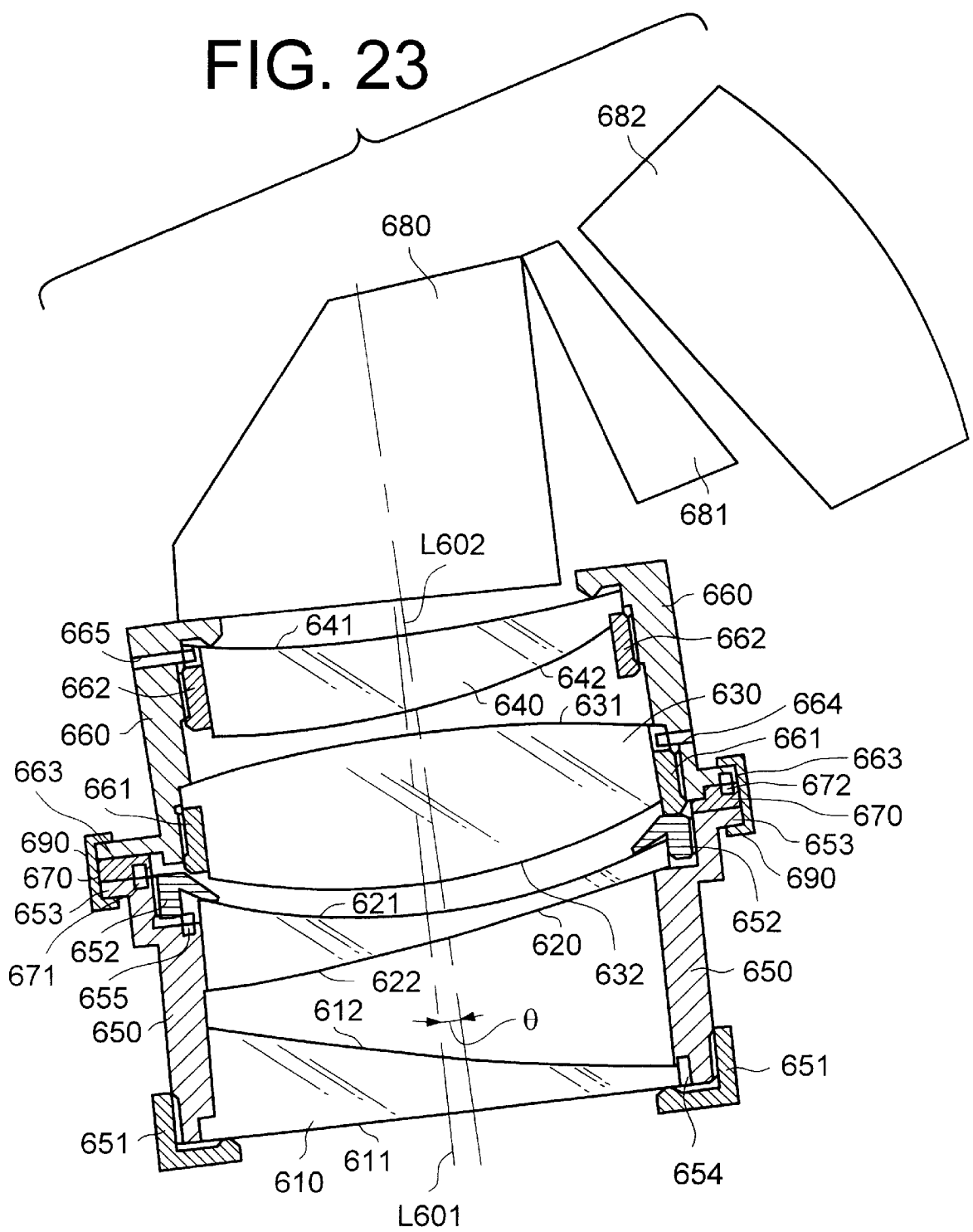
FIG. 23 is a sectional view showing an assembling structure for a decentered lens according to a sixteenth embodiment of the present invention.

FIG. 23 is a sectional view of an assembling structure for decentered lenses, which are housed in a pair of lens barrels, according to a sixteenth embodiment of the present invention.

A reference numeral 610 denotes a first decentered lens, 620 denotes a second decentered lens, 630 denotes a third decentered lens, 640 denotes a fourth decentered lens, 650 denotes a first lens barrel, and 660 denotes a second lens barrel. The first decentered lens 610 and the second decentered lens 620 are accommodated and held within the first lens barrel 650, while the third decentered lens 630 and the fourth decentered lens 640 are accommodated and held within the second lens barrel 660.

The first decentered lens 610 has a first lens surface 611 formed as a plane, and a second lens surface 612 formed as a concave curved surface. The second decentered lens 620 has a third lens surface 621 formed by a concave curved surface, and a fourth lens surface 622 formed as a convex curved surface. For the first decentered lens 610 and the second decentered lens 620, a first centering axis L601 common to the two decentered lenses is set by a line that is perpendicular to the first lens surface 611 and that passes through a center (not shown) of curvature of the third lens surface 621, and the first centering axis L601 corresponds to the axis of the first lens barrel 650.

In the figure, a reference numerals 651 and 652 denote screw rings which are to be screwed to the first lens barrel 650 so that the first decentered lens 610 and the second decentered lens 620 are pressed against the first lens barrel 650 so as to be fixed relative to the first lens barrel 650. Numerals 654 and 655 denote positioning pins for preventing the first decentered lens 610 and the second decentered lens 620 from revolving or turning about the first centering axis L601, respectively.

The third decentered lens 630 has a fifth lens surface 631 and a sixth lens surface 632, each formed as a convex curved surface. Also, the fourth decentered lens 640 has a seventh lens surface 641 formed as a concave curved surface, and an eighth lens surface 642 formed as a convex curved surface. For the third decentered lens 630 and the fourth decentered lens 640, a second centering axis L602 common to the two decentered lenses is set by a line that connects centers (not shown) of curvature of the fifth lens surface 631 and the seventh lens surface 641 with each other, and the second centering axis corresponds to the axis of the second lens barrel 660.

In the figure, reference numerals 661 and 662 denote screw rings which are to be screwed to the second lens barrel 660 so that the third decentered lens 630 and the fourth decentered lens 640 are pressed against the second lens barrel 660 so as to be fixed relative to the second lens barrel 660. Numerals 664 and 665 denote positioning pins for preventing the third decentered lens 630 and the fourth decentered lens 640 from revolving or turning about the second centering axis L602, respectively.

One axial end portion of the first lens barrel 650 is formed into a first flange portion 653 the principal profiles of which are defined by a plane perpendicular to its axis (corresponding to the first centering axis L601) and by a plane parallel to its axis.

An axial end portion of the second lens barrel 660, facing the axial end portion of the first lens barrel 650, is formed into a second flange portion 663 the principal profiles of which are defined by a plane perpendicular to its axis (corresponding to the second centering axis L602) and by a plane parallel to its axis.

Figure 24:
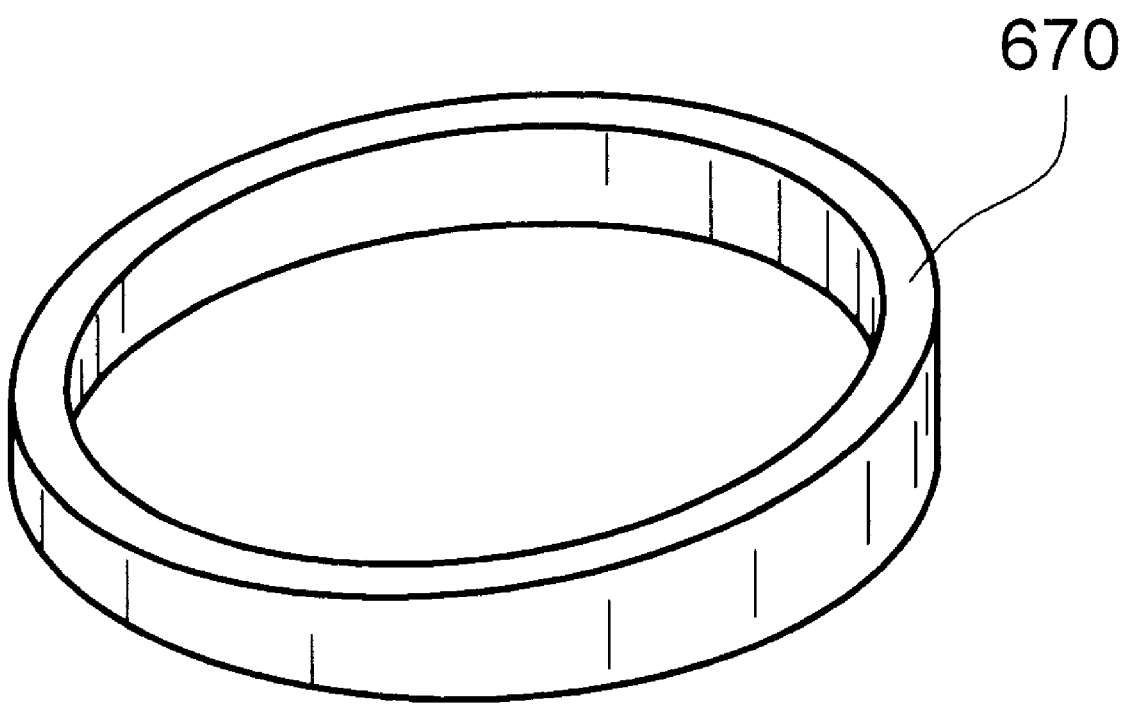
FIG. 24 is a perspective view showing a spacer ring of FIG. 23.

Between the first lens barrel 650 and the second lens barrel 660, is sandwiched a spacer ring member 670 which varies in thickness like a wedge as shown in FIG. 24. By interposing such a spacer ring member 670 between the two lens barrels, the first centering axis L601 of the first lens barrel 650 and the second centering axis L602 of the second lens barrel 660 are inclined by an angle "theta". The spacer ring member 670 and the first lens barrel 650 are positioned by a positioning pin 671, and are restricted from relative rotation therebetween.

The spacer ring member 670 and the second lens barrel 660 are also positioned by a positioning pin 672, and are restricted from relative rotation therebetween.

In the figure, reference numerals 680, 681, 682 denote other optical elements such as prisms and lenses. Numeral 690 in the figure denotes a clamp member for clamping and thereby fixing the first flange portion 653 of the first lens barrel 650, the spacer ring member 670, and the second flange portion 663 of the second lens barrel 660.

As another fixing means substitutable for the clamp member 690, a bolt to pass through these three members plus a nut may be used to tightly fix those members together, or some adhesive may be used to adhesively fix the members to one another.

Alternatively, it is also possible that a bolt insertion hole is formed both in the spacer ring member 670 and either one of the flange portions, while a female screw to be screwed with the bolt inserted through the insertion hole is formed in the other flange portion.

In the first lens barrel 650 with the above construction, fundamentally, the axial end portion can be formed into a planar configuration which is perpendicular to the axis of the lens barrel 650; while in the second lens barrel 660 with the above construction, fundamentally, the axial end portion can be formed into a planar configuration which is perpendicular to the axis of the lens barrel 660. That is, without a particular process of machining the lens barrel end portions into any special configuration, the end portions can be formed in the same manner as with ordinary lens barrels.

Figure 25:
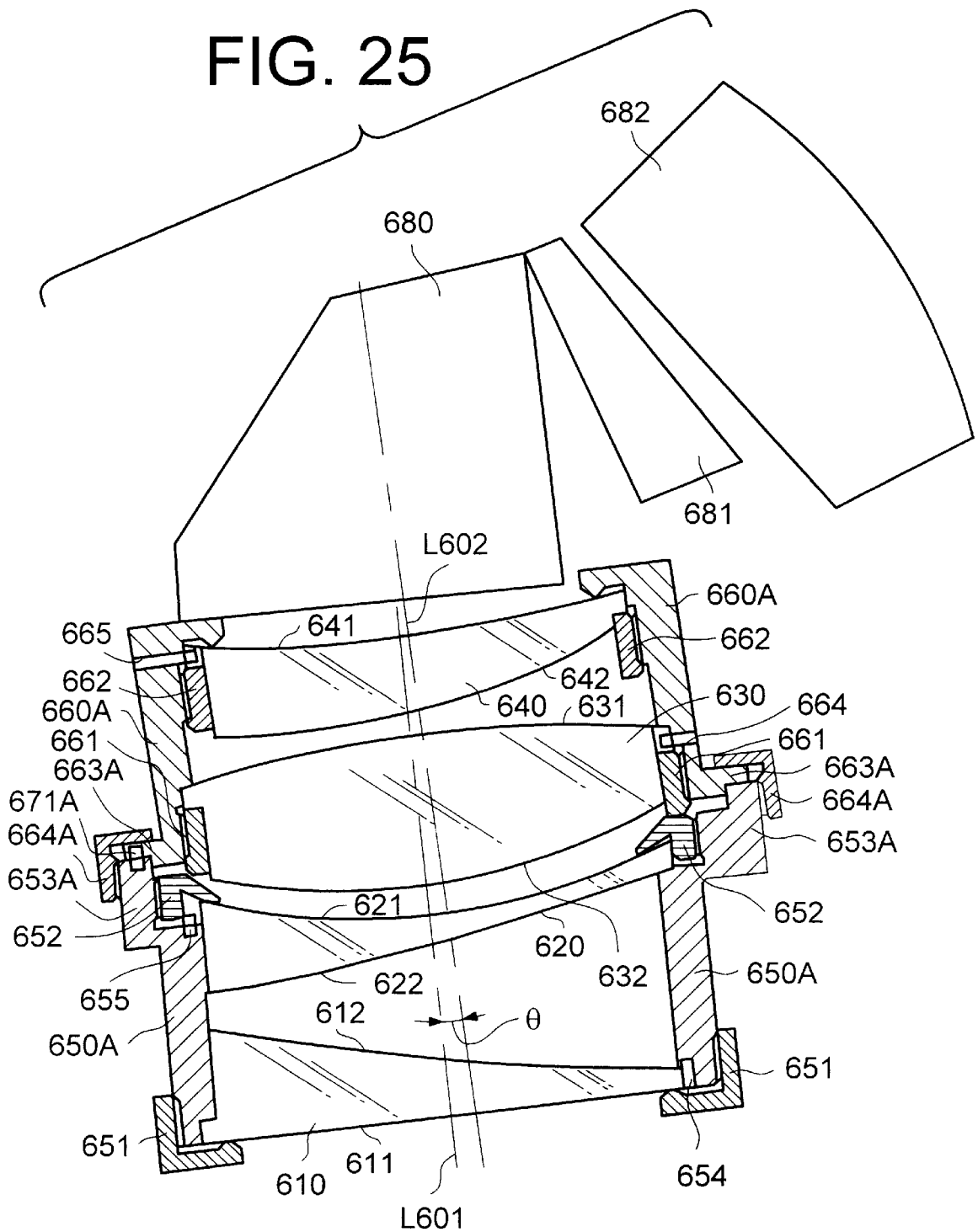
FIG. 25 is a sectional view showing an assembling structure for a decentered lens according to a seventeenth embodiment of the present invention.

FIG. 25 is a sectional view of an assembling structure for decentered lenses, which are housed in a pair of lens barrels, according to a seventeenth embodiment of the present invention.

The decentered lenses, the inner circumferential surfaces of the lens barrels, and the screw rings are similar in arrangement to the foregoing sixteenth embodiment. Therefore, the decentered lenses, the screw rings, the positioning pins, the centering axes and other optical elements are designated by the same reference numerals as in the foregoing embodiment, and their overlapping description is omitted.

In this seventeenth embodiment, a first flange portion 653A having a male screw on the outer circumferential surface at an end portion of the first lens barrel 650A is formed. Meanwhile, a second flange portion 663A, which is contacted or abutted with the first flange portion 653A of the first lens barrel 650A, is formed also at an end portion of a second lens barrel 660A.

On the outer circumference of the second flange portion 663A, is fitted a cap nut 664A which is screwed to the male screw of the first flange portion 653A in order to tighten the first flange portion 653A and the second flange portion 663A to each other.

The first flange portion 653A of the first lens barrel 650A is formed in planar configuration with the axis of the second lens barrel 660A being taken as a reference and not with the axis of the first lens barrel 650A being taking as a reference.

Meanwhile, the second flange portion 663A of the second lens barrel 660A is formed in planar configuration with the axis of the second lens barrel 660A being taken as a reference. Therefore, despite the fact that the axes of the second lens barrel 660A and the second lens barrel 660A do not correspond with each other, the cap nut 664A and the second flange portion 663A can be assembled together as if the axis of the first lens barrel 650A corresponds with the axis of the second lens barrel 660A, where the first centering axis L601 and the second centering axis L602 are inclined to each other by a predetermined angle "theta". A reference numeral 671A in the figure denotes a positioning pin for positioning the first flange portion 653A and the second flange portion 663A relative to each other.

The first lens barrel 650A and the second lens barrel 660A having the above arrangement can be assembled with their axes inclined to the predetermined angle even without using any spacer ring member.

According to the assembling structure for decentered lenses, which are housed in the pair of lens barrels, of the sixteenth and seventeenth embodiments of the present invention, it is easy to construct the assembling structure from the pair of lens barrels which holds the decentered lenses therein, with a state in which the two lens barrels are inclined relative to each other with a predetermined angle therebetween, and without coinciding the axes of the two lens barrels with each other.

FIG. 29 is a sectional view of a lens barrel for a decentered lens, showing a basic concept of eighteenth and nineteenth embodiments of the present invention.

Designated by a reference numeral L810 is a decentered lens, which has a first lens surface 811 and a second lens surface 812. In this decentered lens, a centering axis is determined with the first lens surface 811 taken as a reference, and the lens is held with the centering axis L811 coincident with an axis (not shown) of the lens barrel. A chamfering axis given by a line segment that connects a center of curvature C811 and a surface vertex P811 of the first lens surface with each other is coincident with the axis of the lens barrel. Their suffixed numerals are coincident with the reference numerals of the lens surfaces, respectively.

A center of curvature C812 of the second lens surface 812 that is not taken as a reference is located out of the axis, while a chamfering axis 904 of the second lens surface 812 given by a line segment that connects the center of curvature C812 and a surface vertex P812 of the second lens surface 812 with each other is located out of the axis of the lens barrel.

An inclined plane 815 is given by a plane perpendicular to the chamfering axis 904 (hereinafter, the inclined plane 815 is referred to as a vertical-to-chamfering-axis cutting plane) of the second lens surface 812, while an inclined plane 816 is given by a plane perpendicular to the optical axis X800 illustrated in the figure (hereinafter, the inclined plane 816 is referred to as a vertical-to-optical-axis cutting plane).

When the lens barrel is cut by the vertical-to-optical-axis cutting plane 816 at such a location near a position where the decentered lens L810 is held that the protection of the lens is not impaired, for the lens-barrel opening on the second lens surface 812 side which is not taken as the reference, the lens-barrel opening can be cut out in such a way that pencils of light, or rays of light, are evenly eclipsed at the lens-barrel opening Therefore, it is possible to avoid a problem that only particular pencils of light passing through particular regions of the opening are extremely eclipsed by the lens barrel. Besides, because useless part of the lens barrel is cut, a reduction in weight of the lens barrel can be achieved.

Meanwhile, when the lens barrel is cut by the vertical-to-chamfering-axis cutting plane 815 at such a location near a position where the decentered lens L810 is held that the protection of the lens is not impaired, for the lens-barrel opening on the second lens surface 812 side which is not taken as the reference, there can be provided such an arrangement that no pencils of light will be eclipsed. Besides, because useless part of the lens barrel is cut, a reduction in weight of the lens barrel can be achieved.

Figure 26:
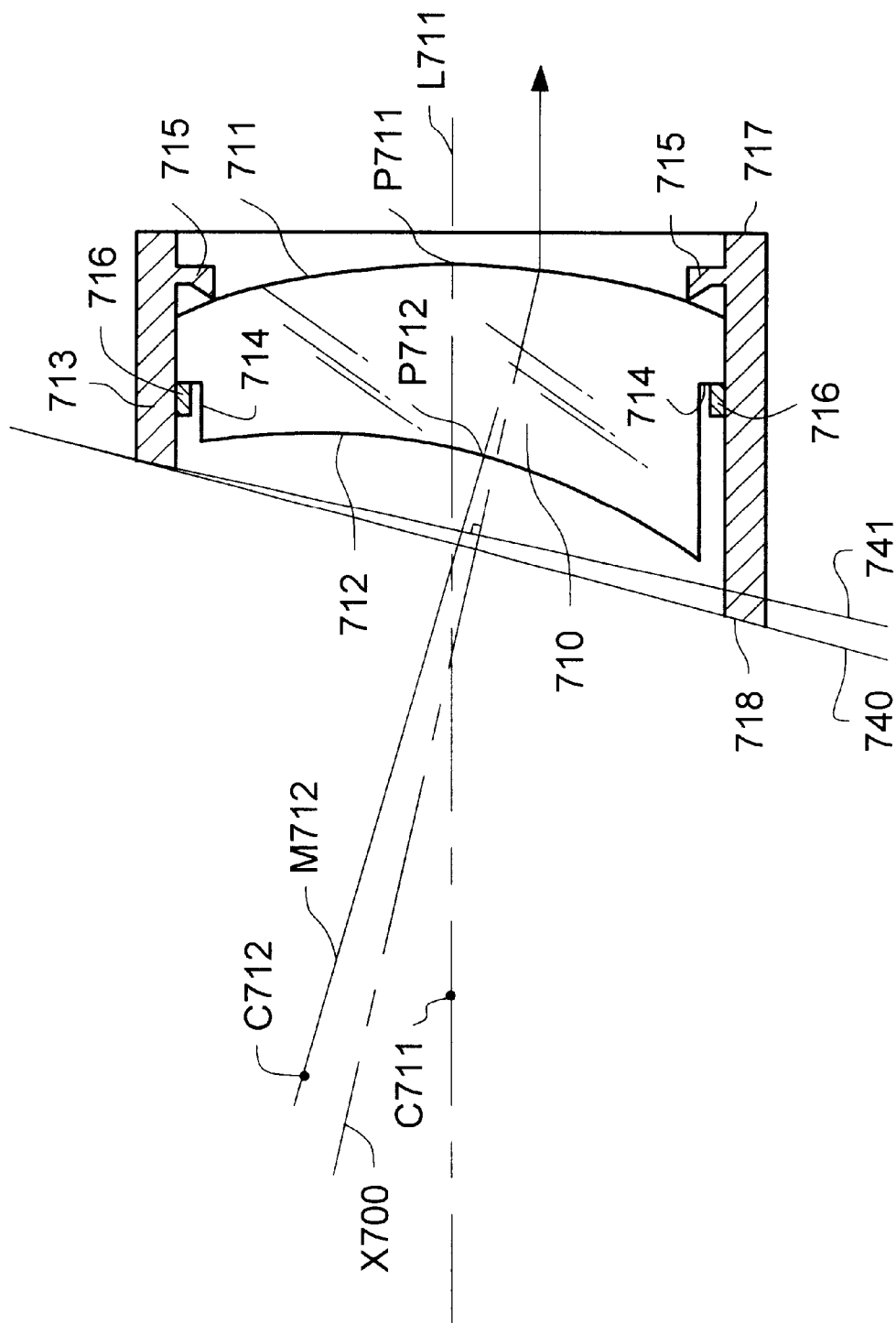
FIG. 26 is a sectional view showing a lens barrel for a decentered lens according to a eighteenth embodiment of the present invention.

FIG. 26 is a sectional view of a lens barrel for one decentered lens, which is constructed based upon the concept as shown in FIG. 29, according to a eighteenth embodiment of the present invention.

As shown in the figure, the decentered lens 710 is held in the lens barrel 713. Referring to the figure, a reference numeral 710 denotes a decentered lens, which has a first lens surface 711 and a second lens surface 712. The centers of curvature of the first lens surface 711 and the second lens surface 712 are points C711 and C712, respectively. Their suffixed numerals are coincident with the reference numerals of the lens surfaces, respectively. For this decentered lens 710, a centering axis L711 is determined with the first lens surface 711 being taken as a reference, and the lens is held with the centering axis L711 coincident with the axis (not shown) of the lens barrel 713. A chamfering axis given by a line segment that connects the center of curvature C711 and the surface vertex P711 of the first lens surface 711 is coincident with the axis of the lens barrel 713.

Meanwhile, the center of curvature C712 of the second lens surface 712 that is not taken as a reference is located or positioned out of the centering axis L711, and the chamfering axis M712 of the second lens surface 712 given by a line segment that connects the center of curvature C712 and a surface vertex P712 of the second lens surface 712 with each other is located or positioned out of the centering axis L711.

In FIG. 26, the optical axis X700 is indicated by one-dot chain line, while effective optical paths of the first and second lens surfaces are indicated by bold lines on their corresponding lens surfaces.

The decentered lens 710 has a step-like peripheral surface which is formed by removing a peripheral part thereof on a side of the second lens surface 712 from the second lens surface 712 towards the first lens surface 711 in a direction parallel to the centering axis L711, so that a flat annular surface 714 is formed around in a radial direction so as to form a recessed surface with respect to the second lens surface 712. This annular-shaped flat surface 714 is located within a plane perpendicular to the centering axis L711. Therefore, the annular-shaped flat surface 714 is axisymmetrical with respect to the centering axis L711. Also, the first lens surface 711, whose center of curvature C711 is located on the centering axis L711, is axisymmetrical with respect to the centering axis L711. As explained above, the lens 710, being a decentered lens, has two axisymmetrical surfaces directed oppositely to each other so that the lens is pinched in a direction of its thickness at the periphery, as in the case where an axisymmetrical lens is held in a lens barrel in an ordinary way.

It is noted that the removing part may be either removed by grinding or other machining processes, or that the step-like surface of the lens may be formed initially in the molding processes.

In a lens barrel 713, a circular lens receiver 715 is formed so as to protrude inwardly and radially from the inner circumferential surface. In this eighteenth embodiment, the peripheral portion of the first lens surface 711 of the decentered lens 710 is supported by the lens receiver 715. Also, a fixing washer 716 contacts with the annular-shaped flat surface 714 of the decentered lens 710. The washer 716, while contacting with the annular-shaped flat surface 714 in such a way that the lens 710 is pressed against the lens receiver 715, is fixed to the lens barrel 713, so that the decentered lens 710 is pinched between the lens receiver 715 of the lens barrel 713 and the washer 716, so as to be held fixed therebetween.

As lens fixing means substitutable for this washer 716, for example, a ring-shaped member equipped with an outer screw that screws to the inner circumferential surface of the lens barrel may be used.

In most cases, the decentered lens is not uniform in lens thickness around the circumference, making it impossible to hold such a lens inside the lens barrel by conventional holding techniques for axisymmetrical lenses. However, if the reference lens surface is determined or set and the centering axis is determined as described above, and if a annular-shaped flat surface perpendicular to the centering axis is formed, then a decentered lens, whatever it may be, can be easily held in the lens barrel in such a way that its axial movement is restricted or prevented.

The center of curvature C712 of the second lens surface 712 that is not taken as a reference is positioned or located out of the axis L711 of the lens barrel 713, while the chamfering axis M712 of the second lens surface 712 given by a line segment that connects the center of curvature C712 and the surface vertex P712 of the second lens surface 712 with each other is positioned or located out of the axis L711 of the lens barrel.

An inclined plane 740 is formed as a plane perpendicular to the chamfering axis M712 (hereinafter, the inclined plane 740 is referred to as a vertical-to-chamfering-axis cutting plane), while an inclined plane 741 is given by a plane perpendicular to the optical axis X700 illustrated in the figure (hereinafter, the inclined plane 741 is referred to as a vertical-to-optical-axis cutting plane).

When the lens barrel 713 is cut by the vertical-to-optical-axis cutting plane 741 at such a location near a position where the decentered lens 710 is held that the protection of the lens is not impaired, for the lens barrel opening on the second lens surface 712 side which is not taken as the reference, the lens-barrel opening can be cut out in such a way that pencils of light, or rays of light, are evenly eclipsed at the lens-barrel opening. Therefore, the problem that particulart pencils of light passing through particular regions of the opening are extremely eclipsed by the lens barrel can be avoided. Besides, because useless part of the lens barrel is cut, a reduction in the weight of the lens barrel can be achieved.

Meanwhile, when the lens barrel 713 is cut by the vertical-to-chamfering-axis cutting plane 740 at such a location near a position where the decentered lens 710 is held that the protection of the lens is not impaired, for the lens-barrel opening on the second lens surface 712 side which is not taken as the reference, there can be provided such an arrangement that no pencils of light are eclipsed. Besides, because useless part of the lens barrel is cut, a reduction in the weight of the lens barrel can be achieved.

By the way, depending on design circumstances, or the like, of the lens barrel, there may be some cases in which it is difficult to cut the lens barrel 713 along the vertical-to-chamfering-axis cutting plane or the vertical-to-optical-axis cutting plane as described above. It is needless to say, however, that those advantages thanks to the respective inclined planes can be enjoyed if the lens barrel is cut by inclined planes as close to the vertical-to-chamfering-axis cutting plane or the vertical-to-optical-axis cutting plane as possible, insofar as the circumstances permit. In other words, it is preferable to cut the lens barrel, being on the side of the second lens surface 712, at an angle which is selected from a range of angles made between the vertical-to-chamfering-axis cutting plane and the vertical-to-optical-axis cutting plane, at such a location near a position where the decentered lens is not impaired.

Figure 27:
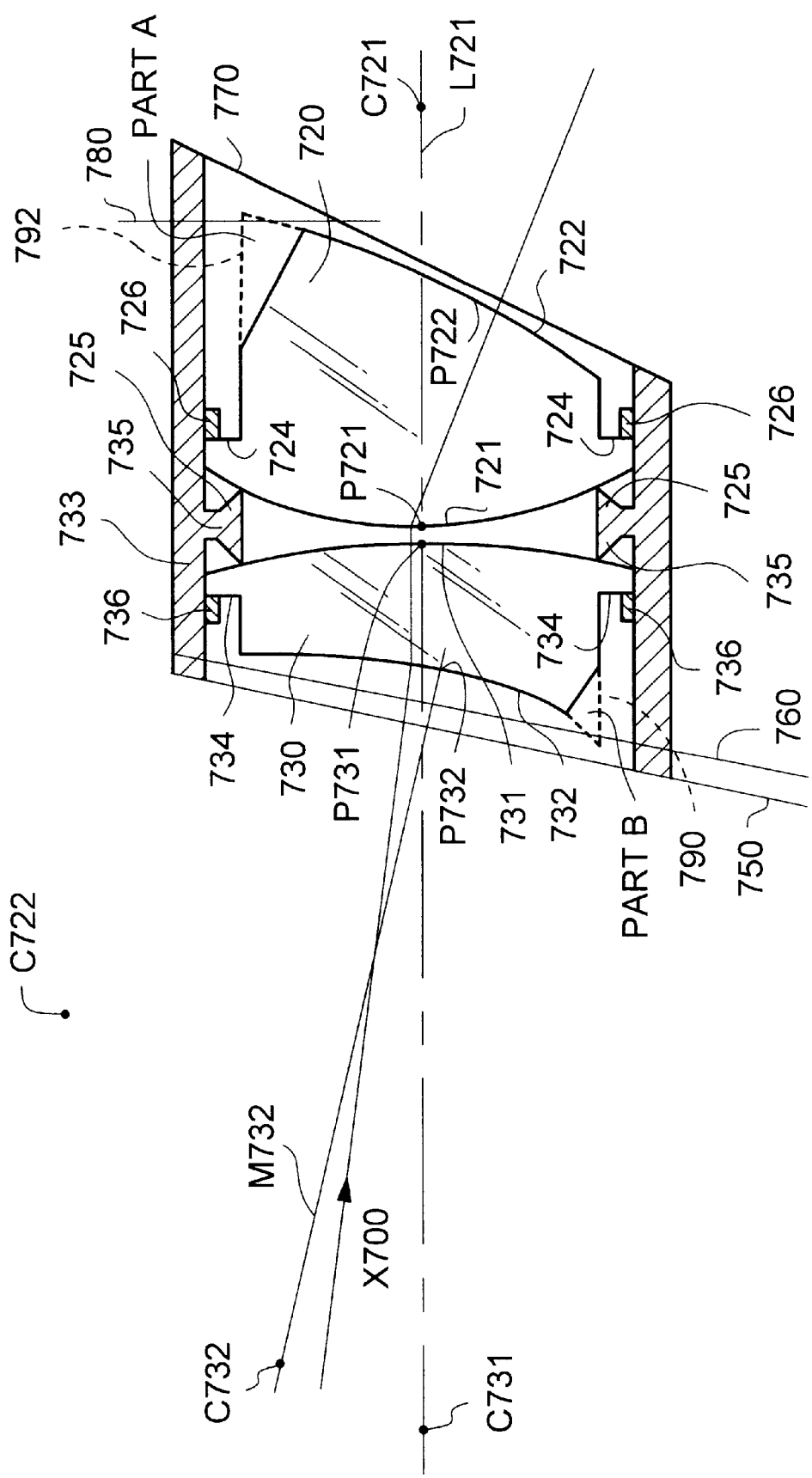
FIG. 27 is a sectional view showing a lens barrel for a decentered lens according to a nineteenth embodiment of the present invention.

FIG. 27 is a sectional view of a lens barrel for a pair of decentered lenses, which is constructed based upon the concept as shown in FIG. 29, according to a nineteenth embodiment of the present invention.

FIG. 27 illustrates the embodiment in which the decentered lenses are cut at parts (which are shown as "PART A" and "PART B" in FIG. 27) which has no importance to an effective optical path (indicated by bold lines in the figure) of the decentered lenses 720 and 730; that is, the decentered lenses are cut at parts that correspond to the parts of the lenses at which there arises no particular optical problems even if the part is cut off.

A first decentered lens 720 has a first lens surface 721 and a second lens surface 722, the centers of curvature of which are points C721 and C722, respectively. A second decentered lens 730 has a first lens surface 731 and a second lens surface 732, the centers of curvature of which are points C731 and C732, respectively. Their suffixed numerals are coincident with the reference numerals of the lens surfaces, respectively.

Also, the second lens surface 722 of the first decentered lens 720, and the second lens surface 732 of the second decentered lens 730 are located on the opening side of the lens barrel. A centering axis L721 common to these two lenses can be determined by connecting the two centers of curvature with each other, the centers of curvature being selected one per lens, where the centering axis is given by a line segment that connects the center of curvature C721 from the first decentered lens 720 and the center of curvature C731 from the second decentered lens 730 with each other.

The first and second lenses 720 and 730 are held with respect to the centering axis L721 which is coincident with an axis (not shown) of the lens barrel 733. The second lens surface 722 of the first decentered lens 720, and the second lens surface 732 of the second decentered lens 730 are not taken as reference surfaces. The center of curvature C722 of the lens surface 722, and the center of curvature C732 of the lens surface 732, are therefore positioned or located out of the common centering axis L721.

A chamfering axis M732 is given by connecting the center of curvature C732 of the second lens surface 732 and the surface vertex P732 of the second lens surface 732 in the second decentered lens 730 with each other. The optical axis X700 is indicated by one-dot chain line in the figure. Effective optical paths of the second lens surface 732 of the second decentered lens 730 and the first lens surface 721 of the first decentered lens 720 are indicated by bold lines on their corresponding lens surfaces.

The first decentered lens 720 has the part ("PART A" in the figure), irrelevant to the effective optical path (shown by a bold line in the figure) of the second lens surface 722, which is cut or removed, and is so shaped that the first decentered lens 720 has a step-like peripheral surface which is formed by removing a peripheral part thereof on a side of the second lens surface 722 from the second lens surface 722 towards the first lens surface 721 around the centering axis L721, so that a flat annular surface 724 is formed around in a radial direction so as to form a recessed surface with respect to the second lens surface 722.

This annular-shaped flat surface 724 is located within a plane perpendicular to the centering axis L721. Therefore, the annular shaped flat surface 724 is axisymmetrical with respect to the centering axis L721.

Also, the first lens surface 721, whose center of curvature C721 is located on the centering axis L721, is axisymmetrical with respect to the centering axis L721. As explained above, the lens 720, being a decentered lens, has two axisymmetrical surfaces directed oppositely to each other so that the lens is pinched in a direction of its thickness at the periphery, as in the case where an axisymmetrical lens is held in a lens barrel in an ordinary way.

It is noted that the removing part may be either removed by grinding or other machining processes, or that the step-like surface of the lens may be formed initially in the molding processes.

In the lens barrel 733, a circular lens receiver 725 is formed so as to protrude inwardly and radially from the inner circumferential surface thereof. In this nineteenth embodiment, the peripheral portion of the first lens surface 721 of the first decentered lens 720 is supported by the lens receiver 725. Also, a fixing washer 726 contacts with the annular-shaped flat surface 724. The washer 726, while contacting with the annular-shaped flat surface 724 of the first decentered lens 720 in such a way that the lens 720 is pressed against the lens receiver 725, is fixed to the lens barrel 733, so that the decentered lens 720 is pinched between the lens receiver 725 of the lens barrel 733 and the washer 726, so as to be held fixed therebetween.

As lens fixing means substitutable for this washer 726, for example, a ring-shaped member equipped with an outer screw that screws to the inner circumferential surface of the lens barrel may be used.

Meanwhile, the second decentered lens 730 has the part ("PART B" in the figure), irrelevant to the effective optical path (shown by a bold line in the figure) of the second lens surface 732, which is cut or removed, and is so shaped that the second decentered lens 730 has a step-like peripheral surface which is formed by removing a peripheral part thereof on a side of the second lens surface 732 from the second lens surface 732 towards the first lens surface 731 around the centering axis L721, so that a flat annular surface 734 is formed around in a radial direction so as to form a recessed surface with respect to the second lens surface 732.

This annular-shaped flat surface 734 is located within a plane perpendicular to the centering axis L721. Therefore, the annular-shaped flat surface 734 is axisymmetrical with respect to the centering axis L731. Also, the first lens surface 731, whose center of curvature C731 is located on the centering axis L731, is axisymmetrical with respect to the centering axis L731. As explained above, the second decentered lens 730, being a decentered lens, has two axisymmetrical surfaces directed oppositely to each other so that the lens is pinched in a direction of its thickness at the peripheral portion, as in the case where an axisymmetrical lens is held in a lens barrel in an ordinary way.

It is noted that the removing part may be either removed by grinding or other machining processes, or that the steplike surface of the lens may be formed initially in the molding processes.

In the lens barrel 733, a circular lens receiver 735 is formed so as to protrude inwardly and radially from the inner circumferential surface thereof. In this nineteenth embodiment, the peripheral portion of the first lens surface 731 of the second decentered lens 730 is supported by the lens receiver 735. Also, a fixing washer 736 contacts with the annular-shaped flat surface 734. The washer 736, while contacting with the annular-shaped flat surface 734 in such a way that the lens 730 is pressed against the lens receiver 735, is fixed to the lens barrel 733, so that the decentered lens 730 is pinched between the lens receiver 735 of the lens barrel 733 and the washer 736, so as to be held fixed therebetween.

As lens fixing means substitutable for this washer 736, for example, a ring-shaped member equipped with an outer screw that screws to the inner circumferential surface of the lens barrel may be used.

With regard to the second lens surface 732 side of the second decentered lens 730, which is not taken as the reference, a pair of inclined planes 750 and 760 are given by the planes which are perpendicular to the optical axis X700 shown in the figure (hereinafter, each of the inclined planes 750 and 760 is referred to as a vertical-to-optical-axis cutting plane).

In case that the second decentered lens 730 has a configuration shown by a broken line 790 (i.e. in case that the second decentered lens 730 has a configuration in which it is not at all cut at the part corresponding to the broken line 790), when the lens barrel 733 is cut along the vertical-to-optical-axis cutting plane 750 at such a location near a position where the second decentered lens 730 is held that the protection of the lens is not impaired, for the lens-barrel opening on the second lens surface 732 side of the second decentered lens 730 which is not taken as the reference, the problem that particular pencils of light, or rays of light, passing through particular regions of the opening are extremely eclipsed by the lens barrel can be avoided.

Besides, because a useless part of the lens barrel is cut, a reduction in the weight of the lens barrel can be achieved.

In case that the second decentered lens 730 has a configuration in which a part shown by the broken line 790 is cut or removed, when the lens barrel 733 is cut along the vertical-to-optical-axis cutting plane 760 at such a location near a position where the second decentered-lens 730 is held that the protection of the lens is not impaired, for the lens-barrel opening on the second lens surface 732 side of the decentered lens 730 which is not taken as the reference, a further reduction in weight of the lens barrel can be achieved as compared with the lens barrel which is cut by the vertical-to-optical-axis cutting plane 750.

Also, with regard to the second lens surface 722 side of the first decentered lens 720, which is not taken as a reference surface, an inclined plane 770 is given as a plane which is perpendicular to the optical axis X700 in the figure (hereinafter, the inclined plane 770 is referred to as a vertical-to-optical-axis cutting plane).

In case that the first decentered lens 720 has a configuration shown by a broken line 792 (i.e. in case that the first decentered lens 720 has a configuration in which it is not at all cut at the part corresponding to the broken line 792), when the lens barrel 733 is cut along the vertical-to-optical-axis cutting plane 770 at such a location near a position where the first decentered lens 720 is held that the protection of the lens is not impaired, for the lens-barrel opening on the second lens surface 722 side of the first decentered lens 720 which is not taken as the reference, the problem that particular pencils of light passing through particular regions of the opening are extremely eclipsed by the lens barrel can be avoided.

Besides, because a useless part of the lens barrel is cut, a reduction in the weight of the lens barrel can be achieved.

The "PART A" of the decentered lens 720 is cut; therefore, it is possible to further reduce weight of the lens barrel 733 by cutting a part thereof by a plane 780 vertical to the axis L721 as illustrated in FIG. 27.

Figure 28:
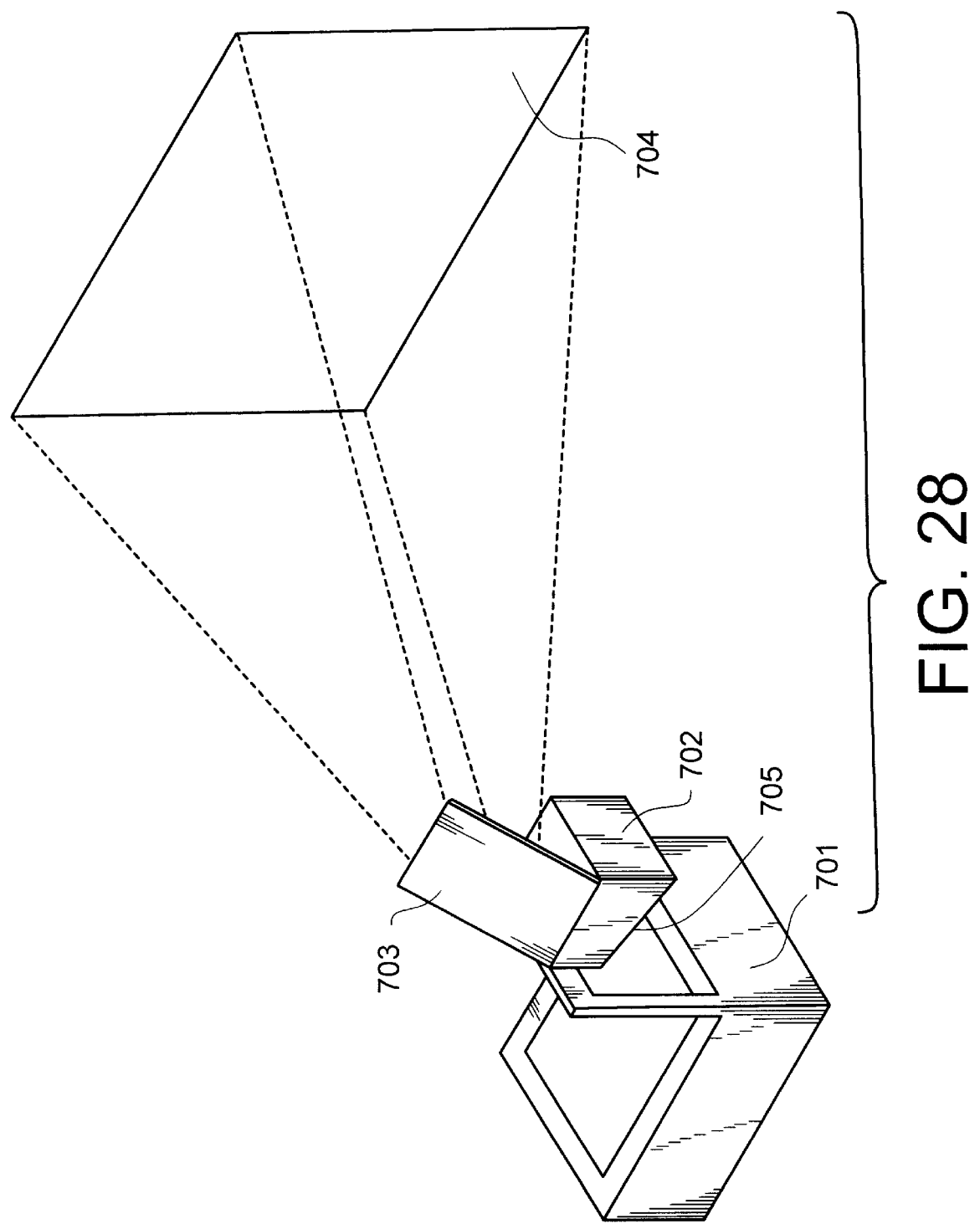
FIG. 28 is a general perspective view showing an overhead projector in which the lens barrel for the decentered lens according to the present invention is used.

FIG. 28 shows a perspective view of an overhead projector (hereinafter, this is referred to as OHP) to which the lens barrel for a decentered lens or lenses according to the present invention is applied. On a main unit 701, a lens barrel 702 as shown in the aforementioned embodiment is installed, and a mirror 703 is provided on the lens barrel 702. The surface for projection is a screen 704. When a document is placed on top of the main unit 701, the document surface is projected by an optical system held by the lens barrel 702 with illumination from the main unit 701. The projection is directed towards the screen 704 by the mirror 703 thereon.

Under the setting, if the lens barrel 702 is cut by a vertical-to-chamfering-axis cutting plane, the image can be projected on the screen 704 without pencils of light being eclipsed. On the other hand, if the lens barrel 702 is cut by a vertical-to-optical-axis cutting plane, pencils of light are eclipsed evenly. Therefore, the problem that pencils of light are locally or partially eclipsed are avoided, thus possible to project more natural images onto the screen.

According to the lens barrel for decentered lenses of the eighteenth and nineteenth embodiments of the present invention, a centering axis of a decentered lens is determined with one of two lens surfaces thereof being as a reference surface, and the centering axis of the decentered lens is made to coincide with an axis of the lens barrel in which the decentered lens is fixedly held. In the construction, because the lens barrel on the side at which the other, not used as the reference surface, of the two lenses locates is cut or formed by an inclined plane which makes a predetermined angle with a plane perpendicular to the centering axis of the lens barrel, the pencils of light are prevented from being eclipsed by an extra or useless part forming the lens barrel which does not holds the decentered lens.

Also, in case that the inclined plane is a plane vertical to the chamfering axis, the eclipse of pencils of light is prevented completely.

Also, in case that the inclined plane is a plane vertical to the optical axis, pencils of light are eclipsed evenly; therefore, the problem that pencils of light are locally or partially eclipsed is avoided. Moreover, in this case, an instrument for measuring optical-system performance, and an instrument for measuring planar-configuration, both of which are attachable in alignment with their optical axes, may be attached thereto as what they are of general purpose.

What is claimed is:

1. A lens holding structure, comprising:
    a lens barrel;
    a decentered lens which comprises a first lens surface and a second lens surface which allow a light path to pass through them in an optical system and which is held in the lens barrel; and
    a fixing member for fixing the decentered lens relative to the lens barrel,
    wherein the first lens surface is a reference surface a centering axis of which corresponds to an axis of the lens barrel,
    wherein the decentered lens further comprises an annular flat surface around the second lens surface, the annular flat surface forming a recessed surface relative to the second lens surface, and the annular flat surface being perpendicular to the centering axis of the reference surface,
    wherein the lens barrel has a lens receiving part, projecting inwardly and radially from an inner surface of the lens barrel, which receives one of the first lens surface and the annular flat surface of the decentered lens, and
    wherein the fixing member contacts one of the annular flat surface and the first lens surface of the decentered lens so that the decentered lens is fixed between the lens receiving part and the fixing member.

2. The lens holding structure as claimed in claim 1, wherein the annular flat surface is axisymmetrical relative to the centering axis.

3. The lens holding structure as claimed in claim 1, wherein the decentered lens further comprises a first cutting surface which exists around in a direction of periphery between the first lens surface and the annular flat surface, comprises a second cutting surface which exists around in the direction of periphery between the second lens surface and the annular flat surface, and comprises a first rotation inhibition part which is formed on one of the first and second cutting surfaces, and
    wherein the lens barrel further comprises a second rotation inhibition part which engages with the first rotation inhibition part for preventing relative rotation between the decentered lens and the lens barrel.

4. The lens holding structure as claimed in claim 1, wherein the fixing member is a washer which is fixed on the inner surface of the lens barrel.

5. The lens holding structure as claimed in claim 1, wherein the fixing member is a lens which is adjacent to the decentered lens.

6. A lens holding structure, comprising:
    a lens barrel;
    a first decentered lens which has a first symmetrical axis of a first lens surface and a second symmetrical axis of a second lens surface, in which the first symmetrical axis and the second symmetrical axis do not coincide with each other, the first decentered lens being held in the lens barrel;
    a second decentered lens which has a third symmetrical axis of a third lens surface and a fourth symmetrical axis of a fourth lens surface, in which the third symmetrical axis and the fourth symmetrical axis do not coincide with each other, the second decentered lens being held in the lens barrel;
    a first fixing member for fixing the first decentered lens relative to the lens barrel; and
    a second fixing member for fixing the second decentered lens relative to the lens barrel,
    wherein a first centering axis, of the first decentered lens, which is determined relative to one, as a first reference surface, of the first lens surface and the second lens surface coincides with a second centering axis, of the second decentered lens, which is determined relative to one, as a second reference surface, of the third lens surface and the fourth lens surface, to form a common centering axis between the first decentered lens and the second decentered lens,
    wherein the common centering axis coincides with an axis of the lens barrel,
    wherein the first decentered lens further comprises a first annular flat surface around the other of the first lens surface and the second lens surface, the first annular flat surface forming a recessed surface relative to the other thereof, and the first annular flat surface being perpendicular to the common centering axis,
    wherein the second decentered lens further comprises a second annular flat surface around the other of the third lens surface and the fourth lens surface, the second annular flat surface forming a recessed surface relative to the other thereof, and the second annular flat surface being perpendicular to the common centering axis,
    wherein the lens barrel has a first lens receiving part, projecting inwardly and radially from an inner surface of the lens barrel, which receives one of the first reference surface and the first annular flat surface of the first decentered lens, and has a second lens receiving part, projecting inwardly and radially from the inner surface thereof, which receives one of the second reference surface and the second annular flat surface of the second decentered lens,
    wherein the first fixing member contacts one of the first annular flat surface and the first reference surface of the first decentered lens so that the first decentered lens is fixed between the first lens receiving part and the first fixing member, and
    wherein the second fixing member contacts one of the second annular flat surface and the second reference surface of the second decentered lens so that the second decentered lens is fixed between the second lens receiving part and the second fixing member.

7. The lens holding structure as claimed in claim 6, wherein the first annular flat surface of the first decentered lens is axisymmetrical relative to the common centering axis, and wherein the second annular flat surface of the second decentered lens is axisymmetrical relative to the common centering axis.

8. The lens holding structure as claimed in claim 6, wherein the first fixing member is a washer which is fixed on the inner surface of the lens barrel, and wherein the second fixing member is a washer which is fixed on the inner surface thereof.

9. A lens holding structure, comprising:
    a lens barrel;
    three or more decentered lenses which are held in the lens barrel; and fixing members for fixing the decentered lenses relative to the lens barrel, wherein each decentered lens has two lens surfaces and two symmetrical axes in which one of the two symmetrical axes does not coincide with the other thereof, wherein the decentered lenses are so arranged in the lens barrel that a centering axis, of each decentered lens, which is determined relative to one, as a reference surface, of the two lens surfaces thereof is made to coincide with each other to define a common centering axis among the three or more decentered lenses, and that the common centering axis is made to coincide with an axis of the lens barrel, wherein each decentered lens further comprises an annular flat surface around the other of the two lens surfaces, in which the annular flat surface forms a recessed surface relative to the other thereof, and in which the annular flat surface is perpendicular to the common centering axis, wherein the lens barrel has lens receiving parts, projecting inwardly and radially from an inner surface of the lens barrel, which receive one of the reference surface and the annular flat surface of each decentered lens, and wherein the fixing members contact one of the annular flat surface and the reference surface of each decentered lens so that each decentered lens is fixed between each lens receiving part and each fixing member.

10. The lens holding structure as claimed in claim 9, wherein the annular flat surface of each decentered lens is axisymmetrical relative to the common centering axis.

11. The lens holding structure as claimed in claim 9, wherein the fixing members are washers which are fixed on the inner surface of the lens barrel.

12. A lens barrel, comprising:

a barrel body; and a lens which is held inside the barrel body, wherein a centering axis of the lens coincides with an axis of the barrel body, and wherein end faces around openings at both axial ends of the barrel body are so formed that the end faces incline with respect to a direction which is perpendicular to the axis of the barrel body.

13. The lens barrel as claimed in claim 12, wherein the lens is a decentered lens which has a first symmetrical axis of a first lens surface and a second symmetrical axis of a second lens surface, in which the first symmetrical axis and the second symmetrical axis do not coincide with each other, and wherein the centering axis is determined with reference to the first lens surface as a reference surface.

14. A lens barrel, comprising:

a first lens barrel;

a first lens which is held inside the first lens barrel;

a second lens barrel which is held inside the first lens barrel; and a second lens which is held inside the second lens barrel, wherein a centering axis of the first lens coincides with a first axis of the first lens barrel, wherein end faces around openings at both axial ends of the first lens barrel are perpendicular to the first axis of the first lens barrel, wherein a centering axis of the second lens coincides with a second axis of the second lens barrel, and wherein the second lens barrel is held in the first lens barrel so that the first axis of the first lens barrel makes a predetermined angle with respect to the second axis of the second lens barrel.

15. A lens holding structure, comprising:

a first lens barrel;

a first decentered lens and a second decentered lens which are fixedly held in the first lens barrel, wherein the first decentered lens has a first lens surface with a first symmetrical axis and has a second lens surface with a second symmetrical axis in which the first symmetrical axis does not coincide with the second symmetrical axis, and wherein the second decentered lens has a third lens surface with a third symmetrical axis and has a fourth lens surface with a fourth symmetrical axis in which the third symmetrical axis does not coincide with the fourth symmetrical axis;

a first fixing member for fixing the first decentered lens relative to the first lens barrel;

a second fixing member for fixing the second decentered lens relative to the first lens barrel;

a second lens barrel;

a third decentered lens which is fixedly held in the second lens barrel which is fixedly held in the first lens barrel, wherein the third decentered lens has a fifth lens surface with a fifth symmetrical axis and has a sixth lens surface with a sixth symmetrical axis in which the fifth symmetrical axis does not coincide with the sixth symmetrical axis; and a third fixing member for fixing the third decentered lens relative to the second lens barrel, wherein a centering axis which is determined with reference to the second lens surface of the first decentered lens is made to coincide with a centering axis which is determined with reference to the third lens surface of the second decentered lens, to form a common centering axis which is made to coincide with an axis of the first lens barrel, wherein the first decentered lens further comprises a first annular flat surface around the first lens surface, in which the first annular flat surface forms a recessed surface relative to the first lens surface, and in which the first annular flat surface is perpendicular to the common centering axis, and wherein the second decentered lens further comprises a second annular flat surface around the fourth lens surface, in which the second annular flat surface forms a recessed surface relative to the fourth lens surface, and in which the second annular flat surface is perpendicular to the common centering axis, wherein the first lens barrel has a first receiving part, projecting inwardly and radially from an inner surface of the first lens barrel, which receives the first decentered lens, and wherein the first lens barrel has a second receiving part, projecting inwardly and radially from the inner surface of the first lens barrel, which receives the second decentered lens, wherein the first receiving part contacts one of the second lens surface and the first annular flat surface of the first decentered lens, and the first fixing member contacts the other of the first annular flat surface and the second lens surface of the first decentered lens, so that the first decentered lens is held between the first receiving part and the first fixing member, wherein the second receiving part contacts one of the third lens surface and the second annular flat surface of the second decentered lens, and the second fixing member contacts the other of the second annular flat surface and the third lens surface of the second decentered lens, so that the second decentered lens is held between the second receiving part and the second fixing member, wherein a centering axis which is determined with reference to the fifth lens surface of the third decentered lens is made to coincide with an axis of the second lens barrel, wherein the third decentered lens further comprises a third annular flat surface around the sixth lens surface, in which the third annular flat surface forms a recessed surface relative to the sixth lens surface, and in which the third annular flat surface is perpendicular to the axis of the second lens barrel, wherein the second lens barrel has a third receiving part, projecting inwardly and radially from an inner surface of the second lens barrel, which receives the third decentered lens, wherein the third receiving part contacts one of the fifth lens surface and the third annular flat surface of the third decentered lens, and the third fixing member contacts the other of the third annular flat surface and the fifth lens surface of the third decentered lens, so that the third decentered lens is held between the third receiving part and the third fixing member, and wherein the axis of the second lens barrel tilts a predetermined angle with respect to the common centering axis.

16. An assembling structure of lens barrel, comprising:
a first lens barrel which has a first axis and has a first end portion in a direction of the first axis, wherein the first end portion has a first planar configuration that is formed with reference to the first axis;
a second lens barrel which has a second axis and has a second end portion in a direction of the second axis, wherein the second end portion has a second planar configuration that is formed with reference to the second axis;
a wedge-like ring spacer which is so provided between the first planar configuration and the second planar configuration that the first axis and the second axis incline a predetermined angle relative to each other.

17. The assembling structure as claimed in claim 16, wherein the first lens barrel holds-a first decentered lens therein, and the second lens barrel holds a second decentered lens therein, wherein a first centering axis of the first decentered lens coincides with the first axis of the first lens barrel, and a second centering axis of the second decentered lens coincides with the second axis of the second lens barrel, so that the first centering axis and the second centering axis incline the predetermined angle relative to each other.

18. An assembling structure of lens barrel, comprising:
a first lens barrel which has a first axis and has a first coupling portion with a first planar configuration that is formed with reference to the first axis; and
a second lens barrel which has a second axis and has a second coupling portion with a second planar configuration that is formed with reference to the first axis, wherein the second coupling portion is connected to the first coupling portion so that the first axis of the first lens barrel and the second axis of the second lens barrel incline a predetermined angle relative to each other.

19. The assembling structure of lens barrel as claimed in claim 18, wherein the first lens barrel holds a first decentered lens therein, and the second lens barrel holds a second decentered lens therein, wherein a first centering axis of the first decentered lens coincides with the first axis of the first lens barrel, and a second centering axis of the second decentered lens coincides with the second axis of the second lens barrel, so that the first centering axis and the second centering axis incline the predetermined angle relative to each other.

20. A lens barrel, comprising:
a barrel body; and
a decentered lens which is held inside the barrel body,
wherein a centering axis of the decentered lens, which is determined with reference to one of two lens surfaces thereof, is made to coincide with an axis of the barrel body, and
wherein an opening edge, of the barrel body, locating on a side of the other of two lens surfaces thereof is formed by a cutting plane which is inclined relative to a plane perpendicular to the axis of the barrel body.

21. The lens barrel as claimed in claim 20, wherein the cutting plane is perpendicular to an optical axis of the decentered lens.

22. The lens barrel as claimed in claim 20, wherein the cutting plane is perpendicular to a chamfering axis of the other of two lens surfaces.

* * * * *